Dec. 25, 1951 H. W. PRICE 2,580,125

TRANSMISSION OPERATING DEVICE

Filed May 11, 1942 10 Sheets-Sheet 1

INVENTOR
HAROLD W. PRICE

BY

ATTORNEY

TRANSMISSION OPERATING DEVICE

Filed May 11, 1942 10 Sheets-Sheet 2

INVENTOR
HAROLD W. PRICE
BY [signature]
ATTORNEY

TRANSMISSION OPERATING DEVICE

Filed May 11, 1942 10 Sheets-Sheet 3

INVENTOR.
HAROLD W. PRICE
BY H. O. Clayton
ATTORNEY.

TRANSMISSION OPERATING DEVICE

Filed May 11, 1942 10 Sheets-Sheet 4

INVENTOR.
HAROLD W. PRICE
BY H. O. Clayton
ATTORNEY.

INVENTOR
HAROLD W. PRICE
BY H. O. Clayton
ATTORNEY

TRANSMISSION OPERATING DEVICE

Filed May 11, 1942 10 Sheets-Sheet 6

INVENTOR
HAROLD W. PRICE
BY H. O. Clayton
ATTORNEY

TRANSMISSION OPERATING DEVICE

Filed May 11, 1942

INVENTOR
HAROLD W. PRICE
BY H. O. Clayton
ATTORNEY

Dec. 25, 1951 H. W. PRICE 2,580,125

TRANSMISSION OPERATING DEVICE

Filed May 11, 1942 10 Sheets-Sheet 8

INVENTOR
HAROLD W. PRICE
BY H. O. Clayton
ATTORNEY

INVENTOR
HAROLD W. PRICE
BY H. O. Clayton
ATTORNEY

Dec. 25, 1951 H. W. PRICE 2,580,125

TRANSMISSION OPERATING DEVICE

Filed May 11, 1942 10 Sheets-Sheet 10

INVENTOR
HAROLD W. PRICE
BY H. O. Clayton
ATTORNEY

Patented Dec. 25, 1951

2,580,125

UNITED STATES PATENT OFFICE 2,580,125

TRANSMISSION OPERATING DEVICE

Harold W. Price, South Bend, Ind., assignor to Bendix Aviation Corporation, South Bend, Ind., a corporation of Delaware Application May 11, 1942, Serial No. 442,465

9 Claims. (Cl. 74—472)

This invention relates to motor vehicles and more particularly to improvements in the transmission of power from the engine to the driving wheels of a motor vehicle.

It is customary, in connection with the drive for motor vehicles, to provide a speed ratio changing transmission for varying the driving ratio between the engine and the vehicle driving ground wheels, and my invention is directed to power means automatically operable, when the accelerator or other manually operated engine control means is depressed slightly beyond the fully opened throttle position, to cut out of operation the engine controlling ignition system as the transmission is being power operated to uncouple the engine of the vehicle and the driving wheels thereof and then to so operate the transmission as to lower the speed ratio between the engine and the driving ground wheels and to again render the ignition operative to effect a speeding up of the engine just prior to the completion of said operation of the transmission.

It follows, therefore, that my invention is directed to means for automatically effecting a change in the transmission speed ratio at a time when the internal combustion engine is incapable, at the then existing setting of the transmission and despite a fully opened position of its throttle, of either maintaining or increasing the speed of the vehicle. Such a lowering of the speed ratio will also probably prevent a choking of the engine should the vehicle be climbing a steep hill.

One of the objects of the invention is to provide, in an automotive vehicle provided with an internal combustion engine and a selective gear change-speed transmission, power means operable, at or below a predetermined vehicle speed or after the engine throttle has been moved to its wide open position, to successively take up slack in the transmission operating system and at the same time disable the ignition system of the engine to facilitate a demeshing of the transmission gears, then initiate and substantially complete an operation of the transmission to either mesh another set of gears or render another set of gears operative and thereby lower the driving ratio between the engine and the drive wheels of the vehicle and then again render the ignition system operative to speed up the engine which operation may be effected just prior to the meshing of the gears. The power means is subsequently operative, at or above a predetermined vehicle speed and after the throttle has been fully closed or substantially closed to effect a sufficient evacuation of the intake manifold, to so operate the transmission as to increase the aforementioned driving ratio.

Yet another object of my invention is to provide a spring and vacuum operated motor unit for operating an automotive transmission, a high gear operation of said unit being effected when the gaseous pressure of the intake manifold is at or below a predetermined factor, the accelerator is positioned anywhere in its arc of throw short of or substantially short of its full open position and the vehicle is travelling above a predetermined speed. A further object of my invention is to so construct and arrange the parts of this motor unit that a low gear operation thereof is automatically effected either when the speed of the vehicle is reduced below a predetermined factor or the accelerator of the vehicle is depressed to a position beyond its full throttle open position.

In carrying out the above objects of my invention I have, in one preferred embodiment of my invention, provided a simple and compact pressure differential and spring operated double acting motor unit including a control valve, a power element, an ignition interrupter switch and an electromagnet or so-called holding coil, the control valve being operated by a spring and a solenoid, the power element of the motor being held in one of its operative positions by means of the holding coil, and both the solenoid and holding coil being controlled by a relay mechanism which is controlled by means including an accelerator operated switch and a governor operated switch.

The principal object of my invention is to provide power means for operating at least a part of the change-speed transmission of an automotive vehicle and for so controlling the ignition system of the vehicle as to facilitate said operation of the transmission by the power means.

Yet another object of my invention is to provide power means for in part controlling the ignition system of an automotive vehicle and for operating at least a part of the change-speed transmission of the vehicle, said power means including a relay mechanism comprising a breaker switch for controlling a valve operating solenoid and a holding coil, the latter elements constituting a part of a motor unit and further comprising another breaker switch for controlling an ignition interrupter switch which also constitutes a part of said motor unit. A further object of my invention is to control the breaker switch operating electromagnet of this relay mechanism by a vehicle speed responsive governor operated switch and an accelerator operated switch.

One of the most important objects of my invention is to include, in power means for operating a change-speed transmission mechanism and for in part controlling the operation of an ignition system, a compact spring and pressure differential operated motor unit including an electromagnet or so-called holding coil, a solenoid operated three-way valve and a cut-out or so-called ignition interrupter switch, said switch constituting a part of the aforementioned ignition controlling means and being mounted in the casing of the motor unit adjacent the holding coil and operably connected to the power element of the motor unit by means of a yieldable connection so constructed as to effect a closing operation of the ignition interrupter switch when the power element is moved to one of its operative positions and make possible a delayed opening operation of said switch when the power element is being moved to another of its operative positions.

Another object of the invention is to provide, in the power plant of an automotive vehicle, means for controlling the operation of a transmission operating and ignition controlling motor unit including a valve operating solenoid, a power element holding coil and an ignition interrupter switch, said means including a governor operated switch for in part controlling the operation of a relay which in turn controls the operation of the valve operating solenoid and the holding coil and further including an accelerator operated switch and a wind operated switch for controlling the operation of another relay which in turn cooperates with the ignition interrupter switch to effect a momentary disabling operation of the ignition system of the vehicle.

The invention also contemplates the provision, as a part of the power plant of an automotive vehicle, of power means serving as a part of the means for operating a change-speed transmission of the power plant and as a part of the means for controlling the operation of the ignition system of said plant to facilitate the power operation of the transmission, said power means including a motor unit comprising an ignition interrupter breaker switch, a valve operating solenoid and a holding coil for the power element of the motor unit, said power means further including a relay mechanism including a breaker switch cooperating with the ignition interrupter switch to control the ignition system and a breaker switch for controlling the operation of the valve operating solenoid and the holding coil, the electromagnet means of the relay mechanism being controlled by an accelerator operated switch, a wind operated switch and a vehicle speed responsive governor operated switch.

Yet another object of my invention is to employ three electrically connected breaker switches and two electromagnetic relays in electrically controlled power means for operating a change-speed transmission, one of said switches, including a grounded wind responsive contact member selectively movable to one or the other of two positions, another of said switches operated by a governor including a centrifugally operable contact member selectively movable, depending upon the speed of the vehicle, to one of the other of two positions and the third of said switches including a contact member connected to the accelerator and selectively movable to one or the other of two positions, all three of said switches cooperating to control the operation of the two relays.

Yet another object of my invention is to provide, in an automotive vehicle comprising an internal combustion engine, a change-speed transmission, an accelerator and a vehicle speed responsive governor, a transmission operating and ignition controlling motor unit controlled by a relay mechanism, said mechanism being in turn controlled by an accelerator operated breaker switch, a governor operated breaker switch and a limit switch operative in accordance with the speed of the engine and operable to disable the operation of the motor unit at or above a predetermined relatively high engine speed.

Yet another object of my invention is to provide a transmission operating and ignition controlling power means constituting a part of the power plant of an automotive vehicle in which the torque load of the internal combustion engine is relieved by momentarily disabling the engine ignition system in order to unload positively engageable drive control elements of the transmission so as to facilitate a disengagement of said elements. In such power plants the engine ignition is sometimes grounded, that is rendered inoperative beyond the desired momentary period either as a characteristic of the transmission control mechanism because of the failure of said mechanism to properly function, sticking of an ignition interrupter or grounding switch, or for other reasons. When the engine ignition system is thus interrupted, usually by grounding the same, the engine is rendered inoperative so that the car cannot be driven under its own power. It is accordingly an object of my invention to provide means for overcoming the aforesaid difficulties, that is an undesired permanent interruption of the ignition system during the operation of the mechanism as it effects a so-called shift-down operation of the change-speed transmission. As indicated above such a means is provided by including in the mechanism, in combination with a power operated ignition interrupter switch, a time delay relay switch which may be in series with the interrupter switch, said relay switch being operative to insure a resumption of operation of the ignition system despite a failure of operation of the interrupter switch.

Another object of my invention is to provide improved means for momentarily interrupting the ignition for a predetermined desired interval of time, the ignition being automatically restored regardless of whether the mechanism responds normally to such interruption in effecting disengagement of the control elements.

Yet another object of my invention is to provide in the power plant of an automotive vehicle power means for establishing a change-speed tranmission in one or the other of two drive ratio settings, said means including a pressure differential and spring operated motor unit comprising a relay controlled valve operating solenoid and a relay controlled power element holding coil, both solenoid and coil being deenergized, by an operation of a relay mechanism, to effect the lower of the two settings of the transmission, said power means further including the ignition switch of the power plant, said switch serving when opened to effect a deenergization of the solenoid and holding coil despite a failure of operation of the relay mechanism.

Yet another object of my invention is to provide, in the power plant of an automotive vehicle, power means for effecting either a kickdown or an upshift operation of a change-speed transmission, the kickdown operation being facilitated, if this operation is effected when the vehicle is traveling at or above a certain speed, by an operation of the power means to momentarily disable the ignition system of the engine of the vehicle and thereby reverse the torque of said engine, said kickdown or downshift operation of the transmission being facilitated, if this operation is effected when the vehicle is travelling below a certain relatively low speed, by a power disengagement of a friction clutch to thereby uncouple the engine from the transmission. An important feature of this embodiment of my invention lies in the construction and arrangement of the parts of the clutch and transmission operating and ignition controlling power means, said parts including a vehicle speed responsive governor which operates, at the aforementioned relatively low vehicle speed, to control that part of the power means which operates the friction clutch and that part of the power means which operates the transmission, said parts further including a switch mechanism also operated by a single means, preferably the accelerator, and operative to control both of the aforementioned parts of the power means.

Yet another object of my invention is to provide a power plant for an automotive vehicle including a manually and power operated friction clutch, a fluid coupling and a manually and power operated change-speed transmission, said power plant being operative to effect, by depressing the accelerator and without manually operating the clutch, a smooth start of the vehicle from rest after the transmission has been manually operated to establish the same in a relatively low gear setting and to thereafter effect, after the transmission has been manually operated to establish a certain setting thereof, an operation of the transmission by power means without operating the clutch.

Yet another object of my invention is to provide an efficient and effective power plant for an automotive vehicle, said plant including an internal combustion engine, an ignition system, including an ignition switch, for in part controlling the operation of the engine, an accelerator, a fluid clutch, a friction clutch, a manually operated clutch pedal, a change-speed transmission, a manually operated shift lever for operating a part of said transmission and power means operative to actuate the transmission to establish one or the other of two settings thereof, operative to disengage the friction clutch, when the vehicle is travelling at or below a certain speed and the accelerator is released to close a switch and to idle the engine, to facilitate the operation of establishing the transmission in one of the aforementioned settings, said power means being also operative to so control the operation of the ignition system as to facilitate the establishment of the transmission in one of the aforementioned settings, said power plant being operative to effect a smooth start of the vehicle from rest, when the engine is not operating and the vehicle is mired, by first closing the ignition switch and depressing the clutch pedal, then cranking the engine, then positioning the shift lever to establish the transmission in a relatively low gear ratio setting, then depressing the accelerator and releasing the clutch pedal, said power plant being thereafter most effectively operated by releasing the accelerator after the desired vehicle speed is attained, then positioning the shift lever to establish the transmission in a relatively high gear ratio setting and then operating the accelerator to effect the desired speed of the vehicle, and in time, to bring the vehicle to a stop.

Other objects of the invention and desirable details of construction of parts will become apparent from the following detailed description of certain embodiments of the invention, taken in conjunction with the accompanying drawings illustrating said embodiments, in which.

Figure 21:
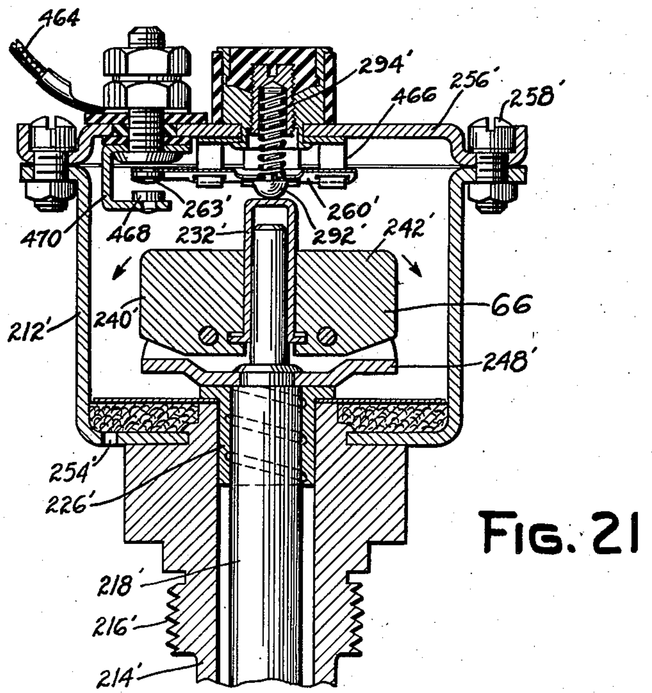
Figures 18, 19, 20:
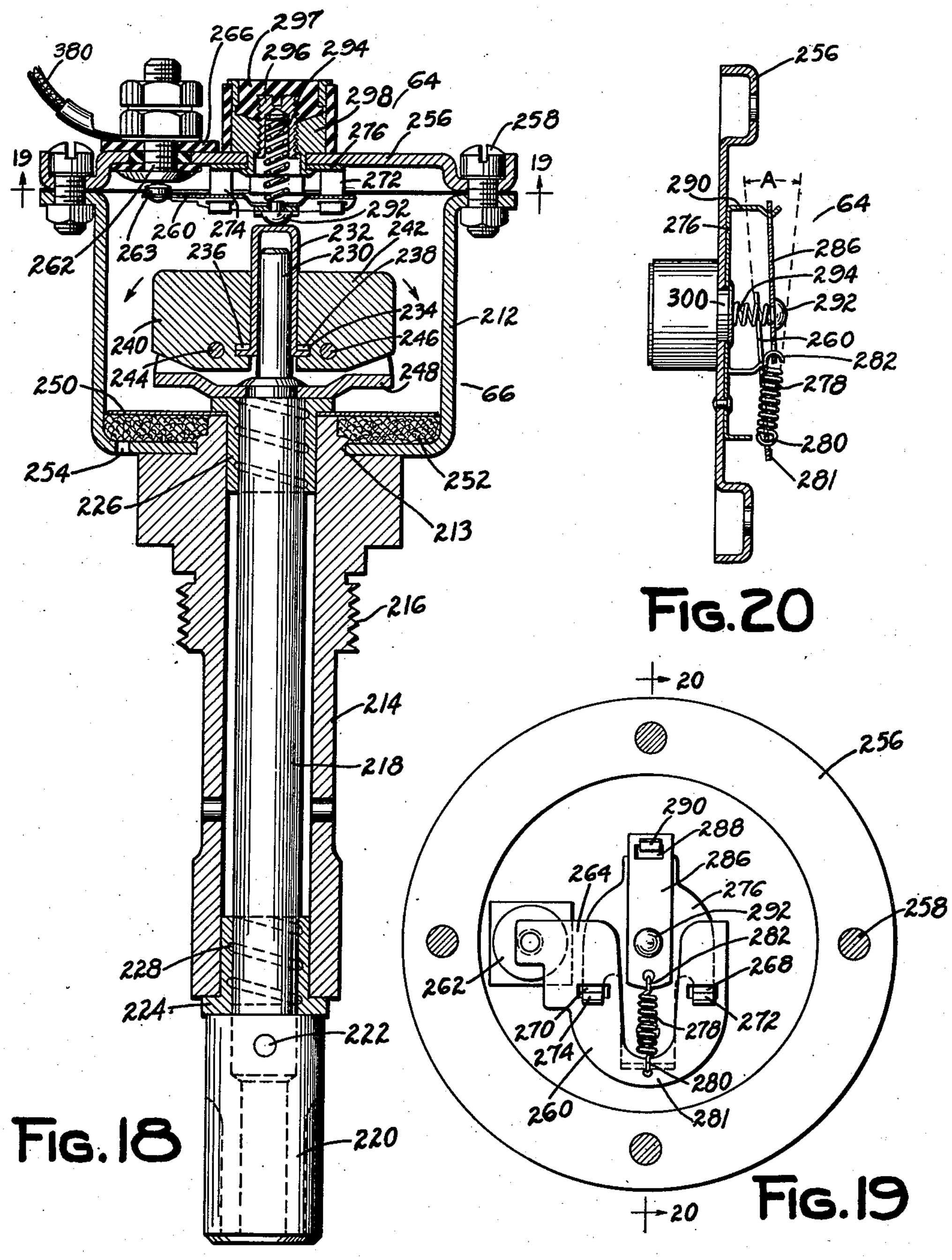
Figure 18 is a longitudinal sectional view showing details of the governor and governor operated switch mechanism constituting a part of the embodiments of my invention disclosed in Figures 1, 2 and 3.
Figure 19 is a view looking in the direction of one of the arrows 19—19 of Figure 18, disclosing the switch mechanism of the governor and switch unit disclosed in Figure 18.

Figure 20 is a sectional view taken on the line 20—20 of Figure 19 disclosing certain details of the switch mechanism of Figure 18; and Figure 21 is a fragmentary sectional view similar to the upper portion of Figure 18 said view disclosing the same switch mechanism as that disclosed in Figure 18 with the exception that the fixed contact of the switch is so positioned that the switch is open with the car at a standstill or travelling below governor speed.

Figure 1:
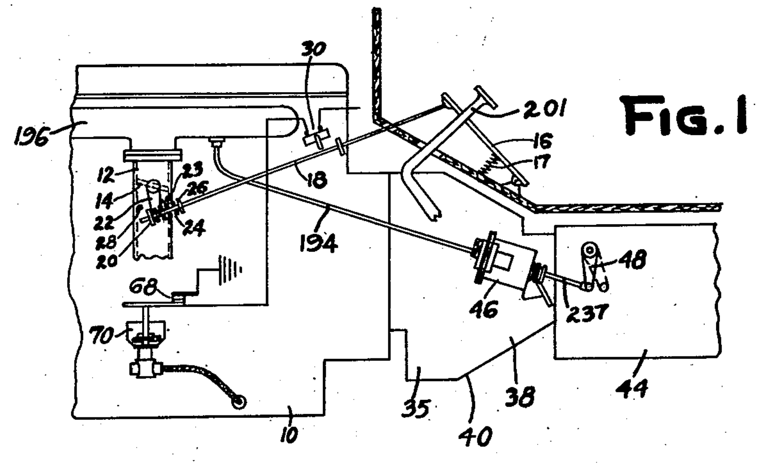
Figure 1 is a side elevational view showing a part of the power plant of a motor vehicle including a fluid coupling, a friction clutch and a change-speed transmission and showing a part of the transmission operating and ignition controlling power means disclosed in Figure 2.

The transmission and ignition controlling mechanism constituting my invention may be employed in conjunction with various types of motor vehicle power plants including a friction clutch, a change-speed transmission and an ignition system for in part controlling the operation of the internal combustion engine of the plant; however, in order to illustrate the use of one embodiment of my invention, I have shown the same incorporated in the power plant diagrammatically disclosed in Figure 1. This power plant includes a conventional internal combustion engine 10 controlled in part by a carburetor 12, a throttle valve 14 which is operated by an accelerator 16. The accelerator, which is biased to its throttle closed position by a spring 17, is preferably connected to the throttle by means of a rod 18, one end of which as disclosed in Figures 1 and 2 extends through an opening in an enlarged end portion 20 of a throttle operating crank 22. This crank is returned to its throttle closed position by a spring 23. A spring 24, stronger than the spring 23 and sleeved over the rod 18, is interposed between the end portion 20 and a stop 26 secured to the rod 18. By means of this construction the throttle is opened when the accelerator is depressed and when the throttle reaches its full open position against a stop 28 any additional movement of the accelerator results in a compression of the spring 24 and a closing of an electrical switch 30. In the embodiment of my invention disclosed in Figure 3 this additional or over-travel movement of the accelerator serves to close a three-pole switch 31 and in the embodiment of my invention disclosed in Figure 4 this over-travel movement of the accelerator serves, by virtue of a pin and slot connection 538, 540 to open a switch 32. The function of the switches 30, 31 and 32 will be described hereinafter. It is also to be noted that by virtue of a pin and slot lost motion connection 33, Figure 3, an accelerator operated clutch control breaker switch 34 is opened during the first increment of throttle opening movement of the accelerator and before the throttle begins to open. The relative timing of operation of the switches 31 and 34 and the throttle 14, Figure 3, will be more completely described hereinafter.

Figures 2, 3:
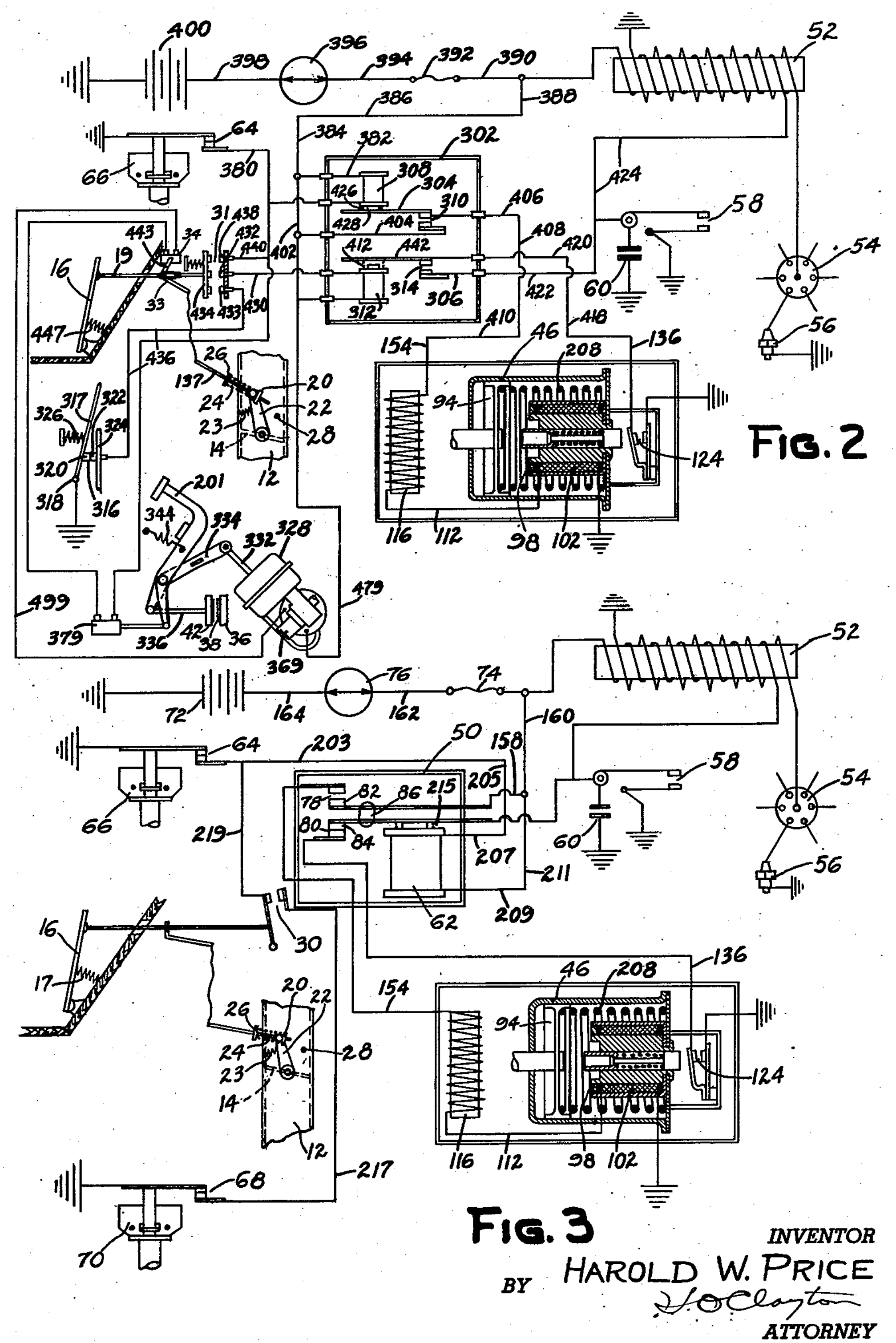
Figure 2 is a diagrammatic view of a preferred embodiment of the transmission operating and ignition controlling power means constituting my invention.
Figure 3 is a diagrammatic view of power means for operating a friction clutch and a change-speed transmission of an automotive vehicle and for controlling the ignition system of the vehicle incidental to an operation of the transmission.

The crank shaft of the engine is preferably connected to the impeller of a fluid coupling 35 of conventional design, the vane runner of which is connected to the driving member 36, Figure 3, of a friction clutch 38 of conventional design. Both the fluid clutch 35 and friction clutch 38 are housed within a casing 40. The driven member 42, that is the driven plate of the friction clutch, is connected to a transmission driving shaft carrying the usual main driving pinion. The transmission mechanism, indicated by the reference numeral 44, Figure 1, is of the change-speed type, that is a mechanism including gears or their equivalent for effecting a plurality of different speed ratios in the driving relation between the internal combustion engine or other prime mover and the propeller shaft of the vehicle. Such a speed ratio varying transmission includes positively engageable drive control elements at least one of which is movable into engaging relation with another of said elements to effect a drive from the engine to the vehicle propeller shaft driving member of the transmission and into disengaging relation with respect to said element to release said drive. These two elements when engaged are subject to thrust application therebetween during the driving operation; accordingly, they resist relative disengagement until such time as the thrust application is relieved. When the engine acting as a prime mover is driving the vehicle and a change-speed operation of the transmission is desired then before the aforementioned movable element may be moved out of engagement with the element meshed therewith the driving torque or driving load of the engine must be substantially reduced.

My invention in one of its aspects is directed to power means for effecting a movement of the aforementioned movable drive control element to one or the other of two operative positions, hereinafter called the upshift psition or the kickdown position, to thereby establish one or the other of two different gear ratios or more broadly stated, speed ratio settings of the speed ratio transmission 44. The transmission mechanism may of course include other means including a manually operable shift lever positioned under the steering wheel, for manually operating the transmission to establish certain drive ratio settings thereof. In the operation of the transmission, in conjunction with the operation of the mechanism disclosed in Figures 2, 3 and 4, either a relatively low or a relatively high gear ratio setting of the transmission is effected by an operation of said manually operated shift lever. The power means of my invention is also operative to suspend for a limited time the operation of the engine driven driving member of the aforementioned relatively movable members and this operation facilitates an operation of the power means to effect the aforementioned kickdown operation of the transmission.

In the embodiment of my invention disclosed in Figure 3 this brief suspension of the driving operation is automatically effected, when the accelerator is released to close the switch 34 and the speed of the vehicle is lowered to or below a predetermined factor, by disengagement of the friction clutch by means of a pressure differential operated motor; and in the embodiments of my invention disclosed in Figures 2 and 4 this suspension of the driving operation or torque reversal operation is effected by momentarily disabling the ignition system of the internal combustion engine when a kickdown operation of the transmission is being effected by the power means. As will be brought out hereinafter the mechanism of Figure 3 is also operative to momentarily disable the ignition system when a kickdown operation of the transmission is effected by fully depressing the accelerator to close the switch 31.

Referring again to Figure 1 there is disclosed a pressure differential and spring operated motor unit 46 operably connected to a crank 48 extending from the casing of the change-speed transmission 44. This crank is of course connected to the above discussed movable drive control element. When the crank is moved by a pressure differential operation of the motor unit to the full line position disclosed in Figure 1 then at that time the transmission is established in its upshift position; in other words, effecting a movement of the crank clockwise may be defined as an upshift operation of the motor unit. When the motor unit is energized by the expansion of a spring there is effected the kickdown operation of said unit and the crank is moved by this operation to the position shown in dotted lines in Figure 1.

Referring now to Figure 2, diagrammatically disclosing a preferred embodiment of my invention, the transmission operating and ignition controlling power means and the most essential parts of the engine controlling ignition system include the aforementioned pressure differential and spring operated motor unit 46 disclosed in detail in Figures 7 and 8, a relay mechanism 50 for controlling the operation of the hereinafter described electrical units in the motor unit, an ignition coil 52, a distributor 54 electrically connected to grounded spark plugs, one of which is indicated by the reference numeral 56, a grounded breaker switch 58, a grounded condenser 60 and means for controlling the operation of the electromagnet 62 of the relay, said means including a grounded breaker switch 64 operated by a vehicle speed responsive governor 66, the aforementioned breaker switch 30 operated by the accelerator 16 and a grounded limit switch 68 operated by an engine operated governor 70. The switch 68 and governor 70, together constituting the unit disclosed in Figure 18, are of the same construction as the switch 64 and governor 66. At this juncture attention is called to the fact that the heretofore described parts of the ignition system, which is of conventional design, are also disclosed in the embodiments of my invention disclosed in Figures 3 and 4. As disclosed in Figure 2 the switches 68 and 30 are wired in series with the electromagnet 62 which is wired to a battery 72, a fuse 74 and an ignition switch 76 being incorporated in the latter electrical connection; and the governor operated switch 64 is wired to the electromagnet 62 in parallel with the series connected switches 30 and 68. If desired, the engine operated governor 70 may be replaced by any other switch operating or controlling means which is operative as a function of the speed of the engine. The relay mechanism 50 of Figure 2 includes the aforementioned electromagnet 62 and two breaker switch 78 and 80, the movable contacts 82 and 84 of which are bound together by a fastening means 86.

Figure 7:
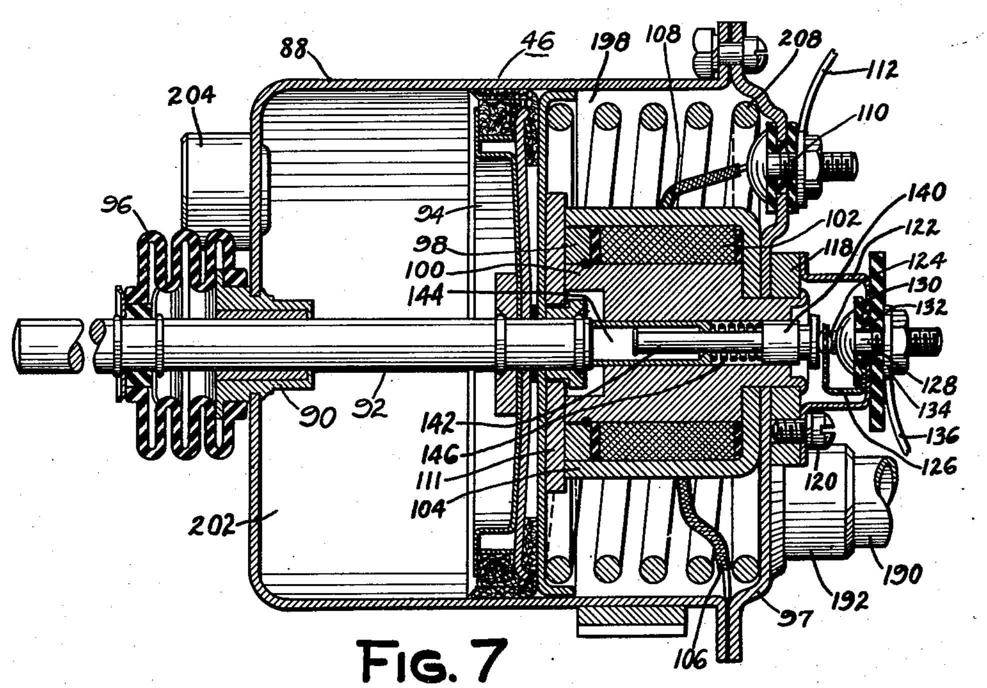
Figure 7 is a sectional view of the motor unit of Figures 5 and 6 disclosing the parts of the mechanism in their upshift position.
Figure 8:
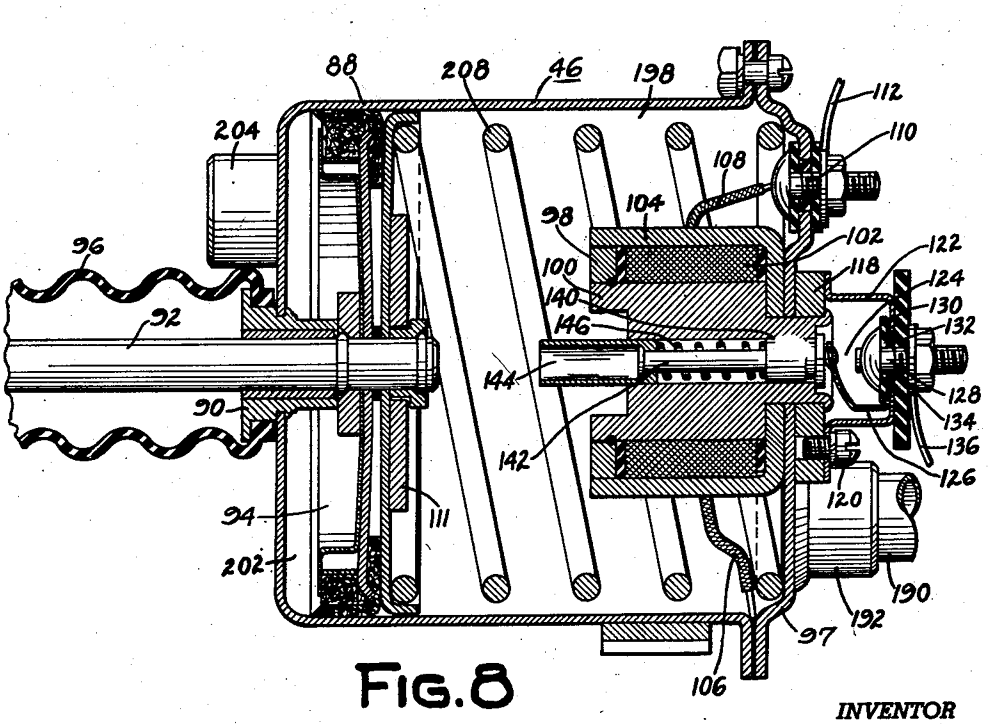
Figure 8 is a view similar to Figure 7 disclosing the parts of the motor unit in their downshift position.

Referring now to Figures 7 and 8 disclosing the details of the transmission operating and ignition controlling motor unit 46 of Figures 1 to 4 inclusive, this unit includes a cup-shaped casing member 88, the base of said member, that is one of the end walls of the motor unit, being provided with an opening to receive a bearing member 90, which slidably receives a rod 92 pivotally connected at one of its ends, Figure 1, to the crank 48, and at its other end fixedly secured to the central portion of a piston 94. Any other suitable power element such as a flexible diaphragm fixedly secured to the casing member 88 may be substituted for this piston. The usual flexible boot 96 of any suitable material, such as rubberized fabric or rubber substitute, interconnects the bearing 90 and the rod. To the peripheral portion of the cup-shaped casing member 88 there is detachably secured a plate 97 constituting the other end wall of the motor unit and to the inner face of said wall there is secured an electromagnet 98 constituting a holding coil for the piston, the operation of said coil being referred to hereinafter. This holding coil includes an iron core 100, bored to slidably receive switch operating means, and a winding 102 the latter being housed between the outer surface of the core and the inner surface of a cup-shaped housing member 104. The winding 102 is grounded to the casing of the motor unit by a conductor 106 and is connected by a conductor 108 to a conductor 110 mounted in the casing member 97 of the motor unit. When the holding coil 98 is energized, which is concurrent with the energization of a valve operating solenoid 116, Figure 17, a plate 111 fixedly secured to the piston 94 is attracted toward said holding coil. The conductor 110 is of course insulated from the casing member 97 and to said conductor there is connected a conductor 112 connected at its other end to the winding 114 of the valve operating solenoid 116. To a plate 118, constituting a part of the means for maintaining the holding coil in place, there is secured, by a screw 120, a cup-shaped plate 122 to which is detachably fastened a so-called ignition interrupter switch 124. This switch includes a yieldable angular shaped metal clip 126 constituting the movable contact member of the switch and is secured to the plate 122 by means of a metal stud 128 constituting the fixed contact of the switch. The stud is insulated from the movable contact member and the plate 122 by suitable means such as washers 130, 132 and 134. To the stud or fixed contact of the switch 124 there is connected a wire 136 leading to the fixed contact of the breaker switch 80 of the relay 50 and the movable contact 126 of the switch 124 is grounded by means of its contact with the plate 122 which is mounted on the member 118 secured to the casing member 97. The motor unit is conveniently detachably secured by a bracket 138 to the chassis of the vehicle which acts as a ground connection. As disclosed in Figure 8 the movable contact 126 of the ignition interrupter switch 124 is shaped to normally be out of contact with the fixed contact 128 of the switch and is forced into contact with the latter contact by means of a yieldable force transmitting means interposed between the motor piston 94 and said contact. This connecting means includes a cylindrically shaped metallic plunger 140 slidably mounted in the bored core 100 of the electromagnet holding coil 98 and to one end of the plunger there is secured a headed stem 142 slidable through an opening in the base of a cup-shaped plunger member 144. A spring 146 surrounding the stem 142 is interposed between one end face of the plunger member 140 and the base of the plunger member 144.

Figure 17:
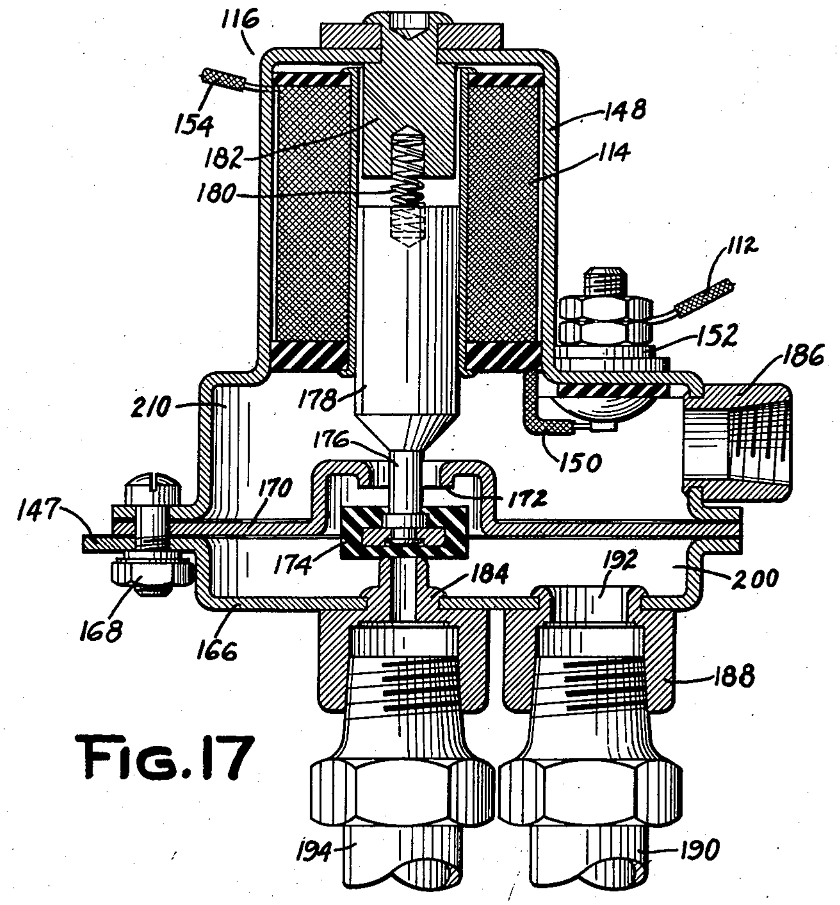
Figure 17 is a sectional view disclosing the details of the three-way control valve and valve operating solenoid of the transmission operating and ignition controlling motor unit disclosed in Figures 5 and 6.

The three-way valve for controlling the operation of the motor unit 46 and the means for operating said valve are disclosed in Figure 17. Describing these elements there is provided a two-part solenoid and valve casing secured to the casing of the motor unit by a bracket 147. The upper part 148 of the two-part casing is cup-shaped and houses the solenoid winding 114 which is connected by a conductor 150 to a conductor 152 secured to said part of the casing and insulated therefrom. To the conductor 152 there is connected the aforementioned conductor 112 which is connected to the winding 102 of the holding coil 98. The solenoid winding 114 is also electrically connected by a conductor 154 to the fixed contact 156 of the relay breaker switch 78, Figure 2, and the movable contact 82 of said switch is connected, by conductors 158 and 160, the fuse 74, a conductor 162, the ignition switch 76 and a conductor 164 to the grounded battery 72.

Figure 5:
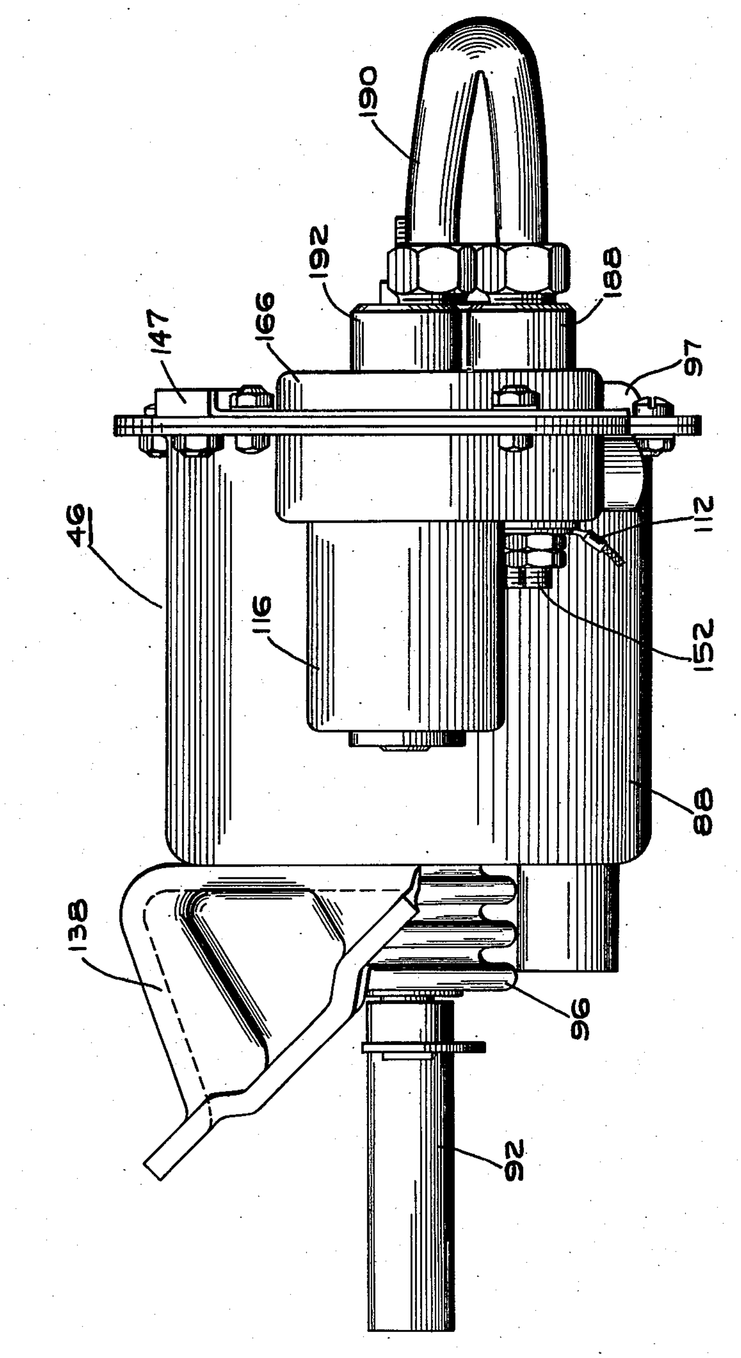
Figure 5 is a side view of the motor unit disclosed in the embodiments of my invention shown in Figures 1–4 inclusive, said unit constituting the principal element of my invention.
Figure 6:
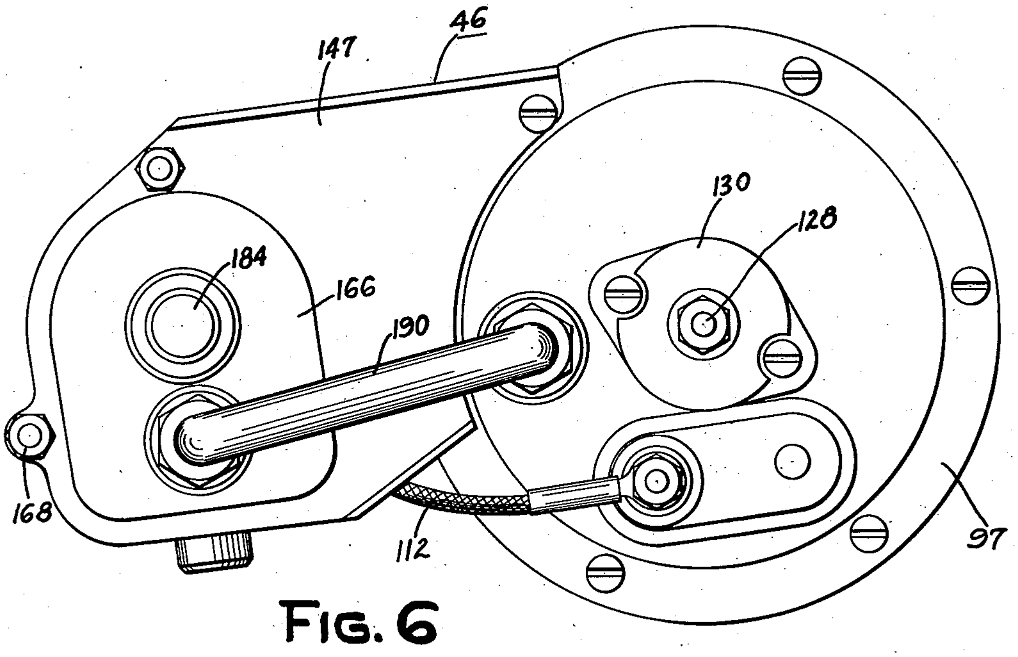
Figure 6 is an end view of the motor unit disclosed in Figure 5.

The lower part 166 fo the two-part solenoid and valve casing is cup-shaped and is detachably secured to the upper part 148 of the casing by fastening means 168; and a valve plate 170, housed within the casing, is secured by the fastening means 168 to the casing parts. This plate 170 is cupped in its central portion and in the base of the cupped portion there is provided an opening outlined by a downwardly extending flange 172. This flange constitutes a seat for a valve member 174 secured to a stem 176 passing through the aforementioned opening in the valve plate and extending from the armature 178 of the solenoid 116. A spring 180, interposed between one end of the armature and a fitting 182 secured to the casing part 148, serves as a means for biasing the valve member 174 to the valve closed position disclosed in Figure 17. In this position of the valve member the same is seated on the upper end of a hollow fitting 184 secured to the lower casing member 166. A hollow fitting 186 secured to the casing member 148, provides a means for venting the interior of said member to the atmosphere and a hollow fitting 188 secured to the casing member 166 receives one end of a flexible conduit 190 connected at its other end to a hollow fitting 192 secured to the end plate 97 of the motor unit 46, all as disclosed in Figures 5 and 6. To the outer end of the fitting 184 there is secured a vacuum conduit 194, said conduit being connected at its other end to the intake manifold 196 of the internal combustion engine 10.

Describing now the operation of the motor unit 46, its control valve 174 and the means for operating said valve when the solenoid 116 is energized, its armature 178 is moved upwardly thereby seating the valve upon the flange 172 of the valve plate 170. The valve is thus opened and there results an energization of the motor unit by a differential of pressures acting upon the power element 94, for the opening of the valve effects a partial evacuation of a motor chamber 198 outlined by the piston or power element 94, the casing member 97 and a portion of the casing member 88. Air is drawn from said chamber 198 via the conduit 190, a chamber 200 outlined by the casing member 166 and valve plate 170, and the conduit 194 connected to the intake manifold. The right side of the piston 94 is, by virtue of the partial vacuum existing in the chamber 198, subject to a relatively low gaseous pressure and the left side of said piston is subject to the relatively high gaseous pressure exerted by the atmosphere, for a chamber 202, outlined by the piston 94 and a portion of the casing member 88, is permanently vented to the atmosphere via a hollow fitting 204 to which may be connected an air cleaner, not shown. An air cleaner may also be connected to the aforementioned fitting 186, Figure 17. Accordingly, the energization of the solenoid 116 results in an upshift operation of the motor unit 46, that is the parts of said unit take the positions disclosed in Figure 7, the rod 92 moving to the right thereby moving the crank 48 to its upshift position. Referring to Figure 7 it will be noted that by this upshift operation of the motor unit the ignition interrupter switch 124 is closed; for when the piston 94 is forced to the right, by the differential of pressures to which it is subjected, the yieldable force transmitting means, including the member 144, the spring 146 and the plunger 140, is operative to angularly move a part 206 of the movable contact 126 of the switch 124 to the right from the position disclosed in Figure 8 to that disclosed in Figure 7.

An important feature of my invention lies in the relative strength of the materials going to make up the spring 146 and the bendable contact member 126; for a greater force is required to collapse the spring 146 than is required to move the switch part 206 to its switch closed position disclosed in Figure 7. It follows therefore that when the aforementioned force transmitting means 140, 144 and 146 is subjected to the load of the rod 92 the switch part 206 will be angularly moved to close the switch 124 before the spring 146 is collapsed. In this operation the member 144 telescopes over the stem 142 from the position disclosed in Figure 8 to the position disclosed in Figure 7.

Completing the description of the operation of the motor unit when its parts assume the positions disclosed in Figure 7, it is to be remembered that the holding coil 98 is energized simultaneously with an energization of the solenoid 116; accordingly, when the piston 94 reaches the position disclosed in said figure it is held in said position not only because of the differential of pressures acting on said piston but also by virtue of the operation of the energized holding coil, for the plate 111 is then held firmly against the end of the core 100.

Describing now the kickdown operation of the motor unit 46 when the valve operating solenoid 116 and the holding coil 98 are deenergized there results an energization of the motor unit by virtue of the operation of a spring 208. This spring, which is interposed between the piston 94 and the casing member 97, is compressed or cocked, to become a source of potential energy, when the piston 94 is moved to its upshift position disclosed in Figure 7. When the solenoid 116 is deenergized the spring 180, Figure 17, expands thereby moving the valve member 194 to the position disclosed in said figure. The chamber 198 of the motor unit is by this operation vented to the atmosphere via the hollow fitting 186, a chamber 210 outlined by a portion of the casing member 148 and the valve plate 170, the opening in said plate, chamber 200, and conduit 190.

The piston 94 is then no longer subject to the force resulting from a differential of gaseous pressures acting upon the same and is free to be moved to the left, to the position disclosed in Figure 8, by the expansion of the spring 208; and this operation of course effects a rotation of the crank 48, Figure 1, to establish the transmission in its kickdown setting.

Now it is an important feature of my invention that during the first part of this kickdown movement of the piston 94, that is when the slack in the system is being taken up, the aforementioned drive control elements of the transmission are being moved out of engagement with each other and the synchronizing mechanism of the transmission is operating, the switch 124 is not opened; for it is to be noted, as is evident from the description of the mechanism given above, that before said switch may open the spring 146 must expand, while the rod 92 is in contact with the member 144, until the parts of the force transmitting means are in the position disclosed in Figure 8. Accordingly, the relative strengths of the spring 146 and the contact member 126 and the construction and arrangement of the cooperating parts are preferably such that when the kickdown operation of the motor unit is taking place, the piston 94 moves a short distance and the spring 146 at the same time expands, before the switch 124 is opened. The purpose of this particular timing of the opening of the switch 124 will be brought out hereinafter when the complete operation of my invention is described.

Figure 9:
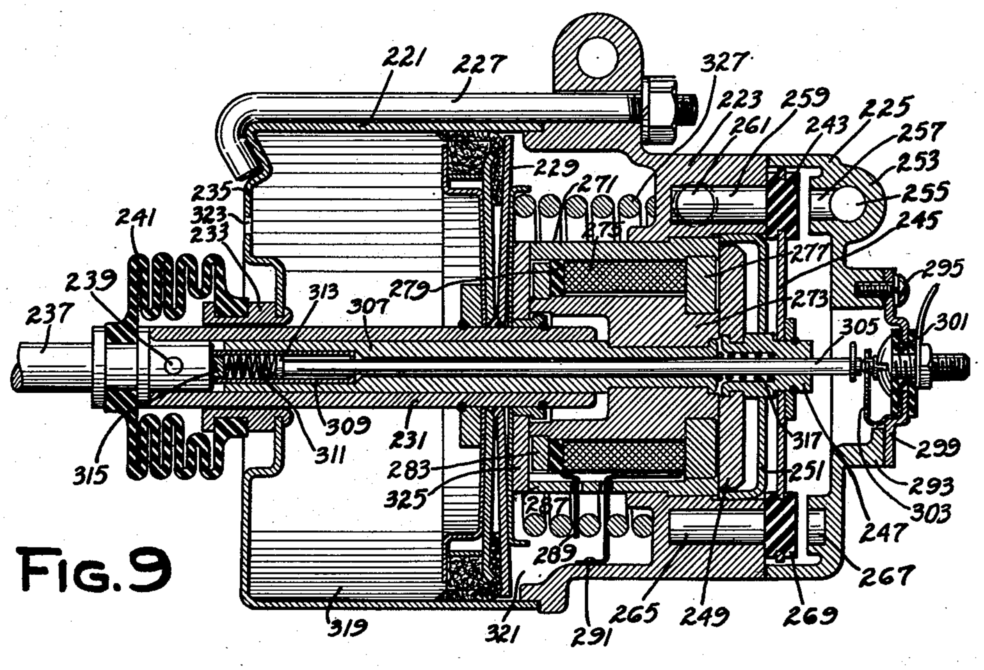
Figure 9 is a sectional view disclosing in detail another embodiment of motor unit, the parts of the mechanism being shown in their upshift position.
Figure 10:
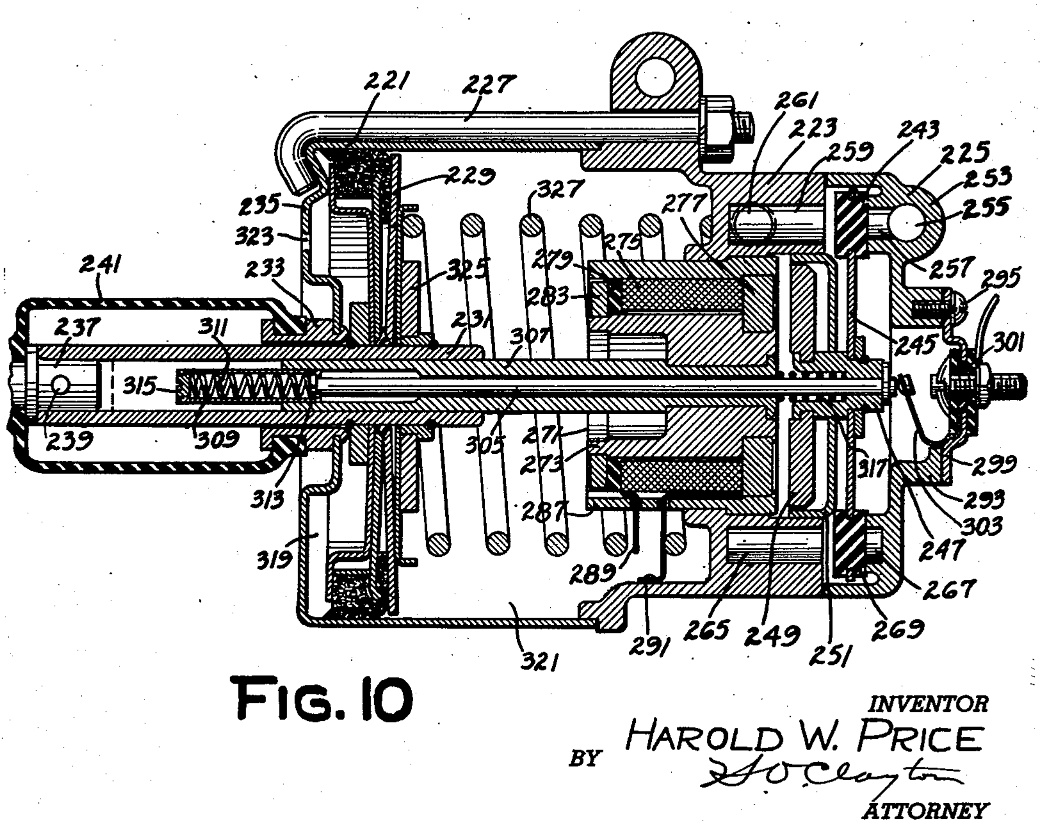
Figure 10 is a sectional view of the motor unit of Figure 9, the parts of the mechanism being shown in their downshift position.

There is disclosed in Figures 9 and 10 another embodiment of a transmission operating and ignition controlling motor unit which may supplant the motor unit 46 constituting a part of the mechanism disclosed in Figures 1–4 inclusive. This motor unit comprises casing members 221, 223 and 225, the members 221 and 223 being detachably secured together by a fastening means 227 and the members 223 and 225 being detachably secured together by studs, not shown. A piston 229, constituting the power element of the motor unit, is reciprocable within the casing member 221 and to said piston there is secured a hollow rod 231 having one end thereof slidably mounted in a bearing member 233 mounted in the end wall 235 of said casing member. A rod 237, Figure 1, is connected at one of its ends by a pin 239 to the rod 231 and at its other end to the transmission operating crank 48. A flexible boot 241, secured at one of its ends to the bearing member 233 and at its other end to the rod 237, serves to prevent the admission of foreign matter into the motor unit.

The operation of the motor unit of Figures 9 and 10 is controlled by a valve structure including a member 243, preferably made of rubber or equivalent material, fixedly secured to one end of a rectangular shaped plate 245. This plate is preferably detachably secured at its center to one end of a cylindrically shaped hub member 247 and to the other end of said member there is secured what may be termed an armature plate 249 preferably made of steel. A cup shaped member 251, sleeved over the member 247, is interposed between the armature plate 249 and the plate 245. Completing the description of those parts of the motor unit going to make up the valve structure, the casing member 225 is enlarged at 253 and said enlargement is bored to provide a duct 255. To that portion of the enlargement or boss 253 constituting the outer end of the duct 255 there is secured, not shown, a conduit leading to the intake manifold of the engine and, as disclosed in Figures 9 and 10, the other end of said duct within the body of the casing member registers with a relatively short port 257. The casing member 223 is bored to provide a duct 259 which registers with a duct 261 in said member. The duct 261 is vented at its outer end to the atmosphere. The casing member 223 may be lightened by the provision of a recess 265 and the casing member 225 may be lightened by the provision of a recess 267. The plate 245 having the valve member 243 mounted on one end thereof may also have secured thereto at its other end a member 269, the same being a duplicate of the valve member 243. By this construction when the member 243 becomes worn the member 245 is rotated 180° thereby reversing the positions of the members 269 and 243.

As with the previously described motor unit 46 the motor unit disclosed in Figures 9 and 10 includes an electromagnet operable to maintain the power element 229 in its upshift position until a kickdown operation of said unit is initiated. As will be described hereinafter this electromagnet, indicated by the reference numeral 271, also functions as a valve operating means. Describing the construction of this electromagnet the same includes a core 273 of suitable material such as iron, a winding 275 surrounding the core, end plates 277 and 279 preferably of brass, an end plate 283 preferably of iron and a casing 287 preferably of steel. To one end of the winding 275 there is connected a conductor 289 leading to the electrical means for controlling the operation of the electromagnet and a conductor 291, connected to the other end of the winding is preferably connected to the casing member 223 which serves as a ground connection.

To an annular flange 293 projecting outwardly from the casing member 225 there is detachably secured, by studs 295, a cup shaped plate 299 and to this plate there is detachably secured a fixed contact member 301 of an ignition interrupter switch which duplicates the function of the previously described switch 124. The yieldable movable contact member 303 of the switch is of the same construction as the previously described movable contact member 126 disclosed in Figures 7 and 8; and as with the mechanism disclosed in the latter figures there is provided a yieldable force transmitting means interposed between the movable contact member and a portion of the linkage interconnecting the power element of the motor unit with the transmission operating crank. This yieldable force transmitting means consists of a pin 305 which is slidably mounted within a member 307 fixedly secured to the core 273 of the electromagnet 271. One end of the pin 305 abuts the movable contact member 303 and the other end of said pin extends through an opening in the base portion of a hollow tubular member 309. Within the member 309 there is housed a relatively strong spring 311 which abuts, at one of its ends, an enlarged end portion or head 313 of the pin 305 and at its other end the spring abuts a plug 315 threadedly mounted in one end of said member.

Describing now the operation of the motor unit disclosed in Figures 9 and 10 and incidentally describing parts thereof not heretofore mentioned, when the electromagnet 271 is energized the armature member 249 is drawn to the left to the position disclosed in Figure 9, that is into contact with the brass plate 277. This operation serves to open the valve by moving the valve member 243 out of contact with the end of the vacuum port 257 and into the contact with the casing member 223 to cover the duct 259 leading to the atmosphere. A valve operating spring 317 is compressed by this operation. The motor unit is then energized by creating different gaseous pressures in compartments 319 and 321 of said unit. The compartment 321 is partially evacuated inasmuch as said compartment is then connected to the intake manifold of the internal combustion engine via a duct, not shown, in the casing member 223 interconnecting the compartment 321 and a compartment 321', port 257, duct 255 and the conduit leading to the intake manifold. The compartment 321' is outlined by the member 251 and portions of the casing members 223 and 225. The compartment 319, outlined by the piston 229 and the end wall 235 of the casing member 221, is permanently vented to the atmosphere by a port 323 in the end wall 235. An air cleaner, not shown, may be connected to the port 323 to prevent the entry of foreign material into the compartment 319.

The piston 229 is thus subjected to a differential of pressures resulting in its movement to the position disclosed in Figure 9 and this operation serves to rotate the crank 48, Figure 1, to establish the transmission in its upshift setting; and this operation of the piston also serves to close the switch 301, 303 mounted in the end of the motor unit and to compress or cock a spring 327 interposed between the piston 229 and a portion of the casing member 223. The piston is held in this cocked position disclosed in Figure 9 so long as the electromagnet remains energized; for a steel armature plate 325, fixedly secured to the hubs portion of said piston, is drawn into contact with the then energized electromagnet.

Describing the switch closing operation after the end of the rod 237 contacts the end of the member 309 further movement of said rod serves to move the member 309, the spring 311 and the pin 305 as a unit, for it is to be remembered that the spring 311 is relatively strong. The spring 311 and the contact member 303 are so constructed that the force necessary to collapse this spring is greater than the force necessary to bend said member into contact with the fixed contact 301. It follows therefore that the switch is closed before the spring 311 is compressed and when said spring is compressed the parts of the switch operating force transmitting means assume the relative positions disclosed in Figure 9.

Describing the kickdown operation of the motor unit disclosed in Figures 9 and 10, when the controls are operated to effect a deenergization of the electromagnet 271 the armature member 325 and the piston 229 secured thereto are no longer held by said electromagnet in the position disclosed in Figure 9. Furthermore, the armature plate 249 is then no longer held by the electromagnet in its valve open position. The valve spring 317 then expands thereby moving the member 247, and the members 249, 251 and 245 mounted thereon, to the position disclosed in Figure 10. This operation serves to cover up the vacuum port 257 and vent the motor compartment 321 to the atmosphere via the ducts 261 and 259, the compartment 321′ and the duct in the casing 223 which is not shown. The gaseous pressures within the compartments 319 and 321 are then equalized thereby permitting the motor unit to be energized by the expansion of the spring 327. This operation results in the transmission being established in its kickdown setting; for the piston 229 and rods 231 and 237 connected thereto are moved to the position disclosed in Figure 10.

Describing now the most important feature of the motor unit disclosed in Figures 9 and 10, that is the time of opening of the ignition interrupter switch 301, 303 with respect to the movement of the piston 209, said switch remains closed during the first increment of movement of said piston, for it will be remembered that the spring 311 was collapsed after the movable contact member 303 had been moved to its switch closed position. It follows, therefore, that as the piston moves to the left during the kickdown operation of the motor unit, the spring 311 expands before the contact member 303 may move to open the switch; and as previously described this movement of the piston, that is that part of the movement completed before the switch opens, serves to effect first a slack takeup in the transmission and the transmission operated linkage connected with the motor piston and also effects a demeshing operation of the transmission mechanism. Continued movement of the piston 229, effected by the expanding spring 327, makes possible the return of the contact member 303 and the movable force transmitting members connected thereto, to their switch opened position disclosed in Figure 10, the ignition system by this operation then resuming its normal operation.

There is thus provided in the motor unit disclosed in Figures 9 and 10 a compact and efficient power means for effecting two operations of the transmission of the vehicle, said motor unit also including part of means for controlling the operation of the ignition system to facilitate one of these operations of the transmission. The electromagnet 271 within the motor unit serves in a dual capacity, that is it functions both as a means for holding the power element of the motor unit in its upshift position and as a means for operating the control valve of said motor unit. The yieldable force transmitting means interposed between the end of the rod 237 and the movable contact member 303 insures, during the kickdown operation of the motor unit, the desired movement of the power element of said motor unit before the ignition interrupter switch is opened.

Describing now the governor 66 and breaker switch 64 operated thereby, disclosed in detail in Figures 18, 19 and 20, this mechanism, hereinafter referred to as a governor and switch unit, includes a cup-shaped casing member 212 having an opening 213 in its base. A drive shaft housing member 214 is secured at its upper end to said casing member, a portion of said member extending through the opening 213. The member 214 may be threaded at 216 to provide means for securing the governor and switch unit to the chassis or any other convenient support. The member 214 is bored to receive a governor drive shaft 218 having a gear member 220 secured to its lower end by a pin 222. The drive shaft 218 is journalled in bearings 224 and 226 which are grooved at 228 to receive a lubricant. To the upper end of the drive shaft there is secured a pin 230 telescoped within a cup-shaped member 232. The lower end of the member 232 is provided with an outwardly extending flange 234 having portions thereof fitting within notches 236 and 238 in centrifugally operated weights 240 and 242 respectively, said weights being mounted on pins 244 and 246. These pins are secured at their ends to a stamping 248 U-shaped in cross section secured to the end of the driving shaft 218. A relatively thin plate 250 is fixedly mounted on the top of the housing member 214 and felt 252 or any other suitable air filter material is packed between the plate 250 and the bottom of the casing member 212. This filter is incorporated in the governor and switch unit for the purpose of cleaning the air which is drawn in via an opening 254 in the base of the casing member 212 into said casing. The filter absorbs any water which is admitted to the interior of the casing via the opening 252; for the operation of the centrifugal weights results in a partial vacuum being created within the unit and as a result air, water and dirt are drawn through the opening 252.

Describing now the breaker switch mechanism disclosed in Figures 18, 19 and 20, the same is mounted on the inner side of a cover plate 256 of the governor and switch unit which plate is detachably secured, by fastening means 258, to the cup shaped casing member 212. The switch mechanism comprises a thin, flat U-shaped metal stamping 260, Figure 19, constituting the movable contact member of the switch and a metal bolt 262 constituting the fixed contact member of the switch. The movable contact which operates as a lever is provided with a metal tab 263 extending inwardly from one end portion of the stamping, said end portion being enlarged at 264 as clearly disclosed in Figure 19. The fixed contact 262 is insulated from its support by any suitable means 266 and is so provided with a metal tab 268 contactible by the tab 263. The U-shaped movable contact is provided with openings 268 and 270 and through these openings extend fulcrum members 272 and 274. The latter members are preferably rectangular in shape and slightly bent at their ends, thereby providing a fulcrum for the contact member 260 when said member is forced against the members 272 and 274 as it is being rocked to open and close the switch. The members 272 and 274 constitute an integral part of a stamping 276 which may be riveted to the inner surface of the casing member 256.

Describing the means for effecting the rocking action of the movable contact member, that is the operation of said member when it functions as a lever, there is provided a coiled tension spring 278 having a hook 280 at one of its ends extending through an opening in a central part 281 of U-portion of said contact member. The other end of the spring 278 is provided with a hook 282 which extends through an opening in one end of a rectangular shaped metal stamping 284. This stamping is preferably provided with a rectangular shaped opening 288 in its other end through which opening there extends a rectangular shaped support member 290. As with the aforementioned fulcrum members 272 and 274 the member 290 is an integral part of the stamping 286 and is slightly bent at its upper end to provide a groove to support the end of the stamping. The central portion of the stamping 286 is provided with an opening through which extends the shank portion of a yieldable member 292 made of any suitable non-conductive material such as synthetic rubber. One end of this member 292 is preferably rounded as disclosed in Figures 18 and 20 and is contacted by the aforementioned cup shaped member 232. A coiled compression spring 294 is sleeved, at one of its ends, over the shank of the member 292 and at its other end is fitted within a screw 296 bored to receive said spring. This screw is threaded into a cylindrically shaped member 298 fixedly secured to the casing member 256 by means of a cylindrical portion 300 extending through an opening in the casing member 256 and bent over at its end to provide means not only to clamp the member 298 in place but also to secure the stamping 276 in place.

Describing now the operation of the governor and the breaker switch operated thereby, it will be noted as disclosed in Figure 20, that when the tension spring 278 extends in a line forming an acute angle A with the plane of the U-shaped movable contact member 260, then said spring exerts a force having a component which lifts the end portion of said contact member upwardly, that is away from the plane of the casing member 256. This condition results in the holding of the contact tabs 263 and 266 in engagement with each other to maintain the switch closed, and the switch remains closed when the car is at a standstill or is travelling below the higher of two so-called critical governor speeds, say thirteen miles per hour, as the speed of the vehicle is being increased. Until this critical speed is reached the governor mechanism does not force the cup shaped member 232 upwardly far enough to move the member 292 and the stamping 286 connected thereto. To effect a closing of the switch the compression spring 294 forces the movable end of the stamping 286 downwardly to the position disclosed in Figure 20 in which position the contact member 260 and spring 278 are out of alignment with each other as disclosed by the angle A in said figure.

When the vehicle speed is being increased and is approaching the aforementioned critical upshift speed of 13 M. P. H., the governor weights 240 and 242 rotate about the pins 244 and 246 in the direction of the arrows shown in Figure 18 thereby forcing the member 232 upwardly to compress the spring 294 and move the spring 278 into alinement with the movable contact member 260. When the aforementioned critical vehicle speed is attained spring 278 is positioned very slightly beyond dead center with respect to the contact member 260; then the longitudinal axis of said spring lies in a plane forming a very small acute angle with the plane of said contact member. The spring then exerts a force having a component tending to pull the portion 281 of the contact member toward the plane of the casing member 256. The contact member acting as a lever is by this operation rocked with a snap action about its fulcrum to open the switch. Upon decreasing the vehicle speed to the critical downshift speed of, say 10 M. P. H., the force exerted by the centrifugal weight driven member 232 is reduced and the spring 294 expands, returning the spring 278 and stamping 286 to their positions shown in Figure 20; and this results in the rocking of the movable contact member about its fulcrum to again close the switch. It is to be noted that due to static friction and other causes, there is a differential of approximately 3 M. P. H. in the aforementioned critical governor speeds; however, this is a desirable feature of the switch mechanism of my invention, inasmuch as such a mechanism is free of the undesirable hunting operation of a breaker switch. By adjusting the setting of the screw 296 with the consequent variation of the loading of the compression spring 294 the critical governor speeds may be varied as desired. To make this adjustment it is necessary to remove a protective packing 297 of wax or other suitable material.

Describing now the operation of the transmission operating and ignition controlling mechanism diagrammatically disclosed in Figures 1 and 2 and incidentally completing the description of the parts thereof with the car at a standstill and the engine idling the driver, preparatory to placing the change-speed transmission in a relatively low gear ratio setting, must first disengage the friction clutch by manually depressing a clutch pedal 201. A manually operated shift lever, not shown, conveniently positioned near the steering wheel of the vehicle, is then actuated to establish the transmission in a low gear setting. The accelerator 16 is then depressed as the clutch pedal 201 is released to engage the friction clutch and the car is gotten under way. In this operation the fluid clutch or fluid coupling cooperates with the friction clutch 38 to effect a smooth start of the vehicle.

Now, it is to be remembered as previously described that when the car is at a standstill or is travelling below a certain speed the governor operated breaker switch 64 is closed as is disclosed in Figures 2 and 18; and when said switch is closed an electrical circuit is completed through the electromagnet 62 of the relay 50. This circuit includes the grounded switch 64, conductors 203, 205 and 207, the electromagnet 62, a conductor 209, a conductor 211, the conductor 160 and the electrically interconnected fuse 74, ignition switch 76 and grounded battery 72. The electromagnet is thus energized thereby drawing the physically interconnected movable contact members 82 and 84 downwardly to break the electrical circuit from the battery to the valve operating solenoid 116 and the holding coil 98 and make the electrical circuit from the grounded ignition interrupter switch 124 to the primary winding of the ignition coil 52. The solenoid and holding coil are accordingly deenergized resulting in a positioning of the power element 94 of the motor unit in the downshift position disclosed in Figure 8 and an opening of the ignition interrupter switch 124, all as previously described.

It follows therefore that the transmission remains established in its downshift setting until the speed of the vehicle is increased to the governor speed which may be 13 M. P. H. As stated above, this critical governor speed may be changed at will by adjusting the screw 296, Figure 18. When this critical speed is reached the governor operating switch 64 is opened, thereby breaking the electrical connection between said switch and the electromagnet 62. The electromagnet is then deenergized resulting in the movable contacts 82 and 84 being moved by a spring 215 to close the relay switch 78 and open the relay switch 80. The holding coil 98 is then energized to later perform its function and the solenoid 116 is energized to open the three-way valve mechanism, Figure 7, controlling the motor unit. The chamber 198 of the motor unit is thus connected with the intake manifold and when the gaseous pressure, or in other words, degree of vacuum of said manifold, reaches a certain factor then the motor unit will be energized, as previously described, to establish the transmission in its upshift setting. This gaseous pressure is effected by releasing the accelerator and this is done by the driver when the desired speed of the vehicle in the kickdown setting of the transmission has been attained. It is not necessary, however, to completely release the accelerator to effect this result. Now when the power element 94 of the then energized motor unit reaches its upshift position disclosed in Figure 7 the energized holding coil 98 maintains said power element in this position until the hereinafter described kickdown operation of the motor unit is effected; for when the air gap between the plate 111 and the end of the holding coil is relatively small, that is after the demeshing operation of the transmission has been completed, the holding coil exerts an appreciable magnetic pull to draw the plate 111 into contact with said end of the coil. The function of the holding coil now becomes apparent, for when the driver, desiring to either speed up the vehicle or to maintain its speed, again depresses the accelerator short of a position to close the switch 30 the gaseous pressure in the manifold and chamber 198 connected thereto is increased. The then energized holding coil, however, serves to maintain power element 94 in its upshift position. It is assumed of course that the car speed is at the time maintained sufficiently high to prevent the closing of the switch 64.

The motor unit 46 is thus automatically operative to establish the transmission in its upshift setting when the accelerator is released far enough to make possible an operation of said unit by vacuum and the car speed is at the time at or above the higher of the two governor speeds; and the transmission, by virtue of the operation of the holding coil, remains in this upshift setting despite a subsequent depression of the accelerator to maintain or increase the speed of the vehicle.

Describing now the kickdown operation of the power means disclosed in Figure 2, it will be assumed that in driving along the road at a moderate speed and with the engine operating at a speed to keep the switch 68 closed, the car approaches another car and the driver desires to pass the latter car. To facilitate this operation the driver automatically lowers the speed ratio setting of the transmission, that is establishes the same in its kickdown setting, by depressing the accelerator to its full open position. As previously described, the throttle is first opened wide when the accelerator is so depressed, the last increment of movement of the accelerator, after the crank 22 has contacted the stop 28 and during the compression of the spring 24, resulting in the closing of the switch 30.

Closing of the switch 30 completes an electrical circuit including the then grounded switch 68, a conductor 217, the switch 30, a conductor 219, conductors 203, 205, 207, electromagnet 62, the grounded battery 72 and the electrical means interconnecting the electromagnet and battery. The electromagnet 62 is then energized to close the relay switch 80 and open the relay switch 78. As previously described this operation results in the motor unit 46 being energized by an operation of the spring 208 to effect the kickdown setting of the transmission and the momentary disabling of the ignition system to facilitate this operation of the transmission. The driver will probably maintain this setting of the transmission, by keeping the switch 30 closed, until his car is safely ahead of the car which was passed whereupon he will, after the desired car speed is attained, again release the accelerator to effect the previously described upshift operation of the transmission.

At this junction it is well to describe the function of the switch 68. This switch and its governor 70 are of the same construction as the switch 64 and governor 66, Figure 18; however, the screw 296 is adjusted to effect an opening of the switch at a relatively high engine speed, say 2500 R. P. M. and a closing of the switch at a speed of say 2400 R. P. M. The governor 70 is, as disclosed in Figure 1, drivably connected to the engine to operate in direct proportion to the speed of said engine; however, inasmuch as the switch 68 is to be operated at certain critical engine speeds it is apparent that any other switch operating engine speed responsive means may supplant said governor. The function of the switch 68 is to make it impossible to effect a kickdown operation of the motor unit 46 when the R. P. M. of the engine is relatively high; for if the ignition system were disabled at this time, even for a relatively short time, there might result such an accumulation of unburnt gas in the engine system that when the ignition system was restored to action there would result an undesirable backfire. Another objection to effecting a kickdown operation of the power means at high engine speeds lies in the fact that there may result an undesired deceleration of the vehicle when this operation is being carried out; for when the engine speed is high the vehicle speed is proportionately high, the transmission being then established in its upshift setting. When the ignition system is then disabled, that is cut out of operation, the engine speed is lowered; accordingly, as the kickdown operation of the transmission is being effected the vehicle must in effect pick up the load of the engine; and this operation results in an appreciable momentary deceleration of the vehicle which is of course objectionable to the passengers in the vehicle.

Assuming now that the vehicle is driven into hilly country, the driver, when the vehicle reaches the base of a relatively steep hill, will of course want to change the drive ratio between the engine and the driving wheels; in other words, he will probably decide to operate the transmission to establish the kickdown setting thereof. To effect this operation of the transmission the driver has merely to depress the accelerator 16 far enough to close the switch 30, thereby effecting the kickdown operation of the motor unit 46. It is assumed of course that the engine speed is not, by this full opening of the throttle, increased sufficiently to open the grounded switch 68. This critical high engine speed will in all probability not be reached inasmuch as the accelerator will probably be depressed, to effect the kickdown operation of the transmission, after the vehicle has begun to climb the hill and the vehicle has to some extent slowed down; and when the vehicle is climbing the hill the engine is under sufficient load to hold down the R. P. M. thereof, thereby preventing a switch opening operation of the governor 70 or the switch opening operation of any other speed responsive switch opening means which might be substituted for said governor.

After passing over the hill the accelerator will probably again be released sufficiently to again energize the motor unit by vacuum to effect an upshift operation of the transmission and when the speed of the vehicle is decreased below governor speed in bringing the vehicle to a stop the motor unit will, by virtue of the closing of the governor operated switch 64, again be energized by the spring 208 to effect another kickdown operation of the transmission.

There is thus provided, in the mechanism disclosed in Figure 2, means for effecting an upshift operation of the transmission 44 when the vehicle is travelling above governor speed and the accelerator is released sufficiently to effect an energization of a motor unit by vacuum; and this mechanism also provides means for effecting a kickdown operation of the transmission either when the vehicle is slowed down to governor speed or when the engine R. P. M. is below a certain factor to insure a closing of a switch and the accelerator is depressed sufficiently to close a switch operated thereby. With the mechanism disclosed in Figure 2 there is no need to operate the friction clutch except when it is desired to manually establish the transmission in a low or often called mud gear setting thereof; for to establish the transmission in its upshift setting the reversal of the engine torque by releasing the accelerator, the operation of the fluid clutch and the operation of a free-wheeling mechanism located between the rearmost driven element of the transmission and the differential make it unnecessary to disengage the friction clutch.

There is diagrammatically disclosed in Figure 3 another embodiment of my invention wherein there is provided power means for establishing the transmission in either its upshift or kickdown settings and for operating the friction clutch and controlling the ignition system to facilitate the operation of the transmission to effect its kickdown setting. The clutch operating power means of this embodiment of my invention serves to facilitate the kickdown operation of the transmission when the vehicle is being brought to a stop; and a momentary disabling of the ignition system serves to facilitate this kickdown operation when the accelerator is depressed to close the switch 31.

As disclosed in Figure 2 the above described transmission operating and ignition controlling motor unit 46 is controlled by a relay mechanism 302 including two separate relays 304 and 306. The relay 304, comprising an electromagnet 308 and a breaker switch 310, serves to control the operation of the valve operating solenoid 116 and the holding coil 98 of the motor unit and the relay 306, comprising an electromagnet 312 and a breaker switch 314, cooperates with the ignition interrupter switch 124 to provide means for momentarily disabling the ignition system when and only when the kickdown operation of the transmission is initiated by depressing the accelerator to its full open position. An electromagnet 308 of the relay 304 is controlled by either the above described governor operated switch 64, Figure 18, or by the accelerator operated three-pole switch mechanism 31 and a grounded wind operated switch 316. The latter switch includes a flat plate 317′ of relatively large area pivotally mounted at 318 or some convenient part of the engine where it will receive the current of air from the engine cooling fan but will not be materially affected by the air passing through the radiator grill. The force exerted by this current of air will therefore be substantially directly proportional to the speed of rotation of the fan and therefore substantially directly proportional to the R. P. M. of the engine. To one side of the plate 316 there is secured the movable contact 320 of the wind switch anad said contact, when the switch is closed, abuts a fixed contact 322 of the switch secured to some part of the engine or any other convenient support 324. Describing the operation of this switch, at a relatively high speed of the engine, say 2500 R. P. M. the plate 316 is subjected to a force exerted by the current of air generated by the cooling fan and this force is of sufficient magnitude to move the plate clockwise against the tension of a spring 326 to close the switch. It follows of course that when the speed of the engine drops below 2500 R. P. M. the spring 326 functions to open the switch 316.

Describing that part of the power means of Figure 3 operative to control the engagement and disengagement of the friction clutch 38, there is provided a single acting pressure differential operated motor unit 328, Figures 1 and 11 to 14 inclusive, the power element 330 of which is operatively connected by a rod 332 to a lever 334 connected by a rod 336 to the driven plate 42 of the friction clutch 38. The clutch operating motor 328 is controlled by valvular mechanism, disclosed in detail in Figures 13 and 14, including a three-way valve mechanism 338, operative to initiate the clutch disengaging and clutch engaging operations of the motor, a first stage bleed valve 340, automatically operative, when the clutch plates contact at a predetermined load, to terminate a relatively fast clutch engaging movement of the motor power element 330 and a second stage bleed valve 342, Figures 15 and 16, operated by the accelerator and operative to control the loading of the clutch plates as said plates are moved, by a clutch spring 344, into firm engagement with each other.

Figure 11:
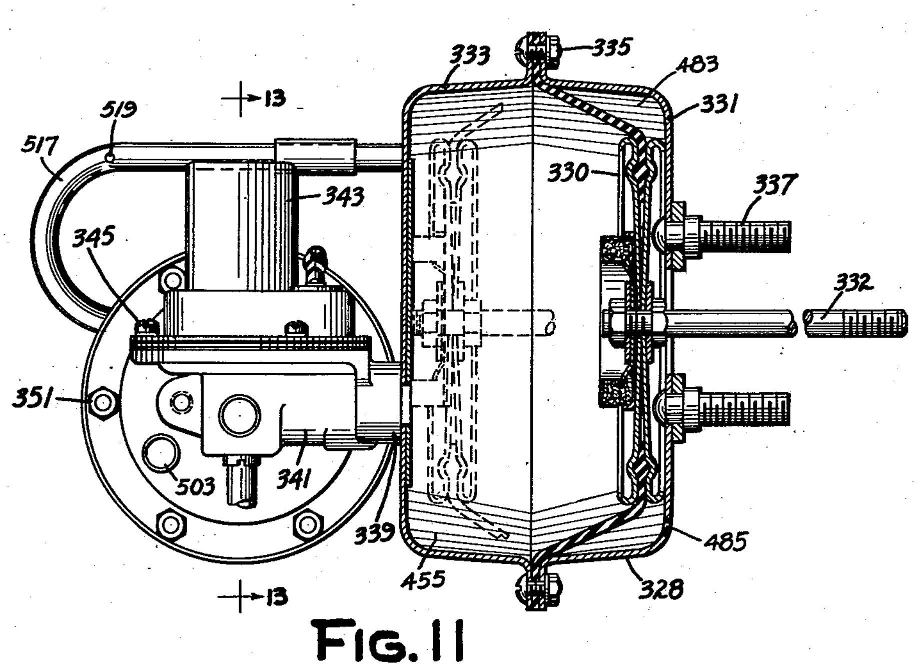
Figure 11 is a view of the clutch control motor and valve unit of that embodiment of my invention disclosed in Figure 3, the valve mechanism being shown in end elevation and the motor being shown in longitudinal section.
Figure 12:
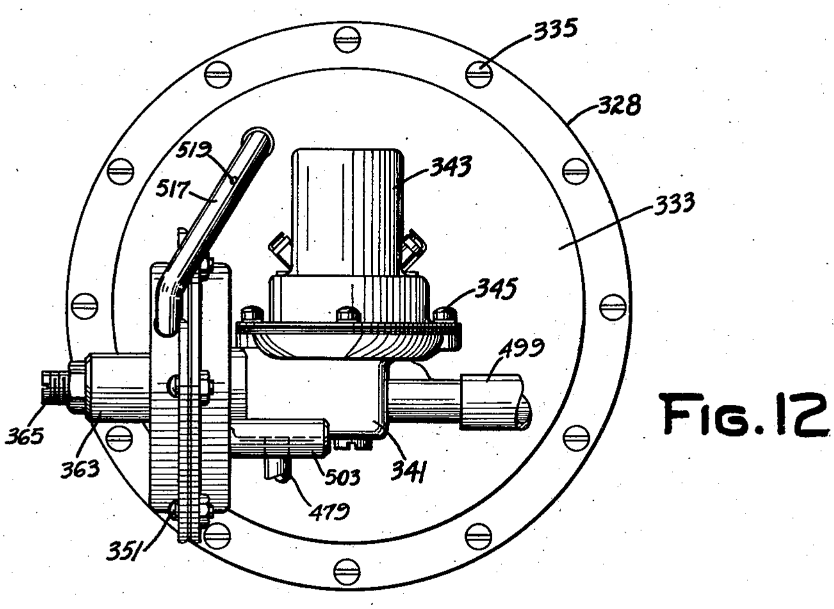
Figure 12 is an end elevational view of the motor and valve unit of Figure 11.
Figures 13, 14:
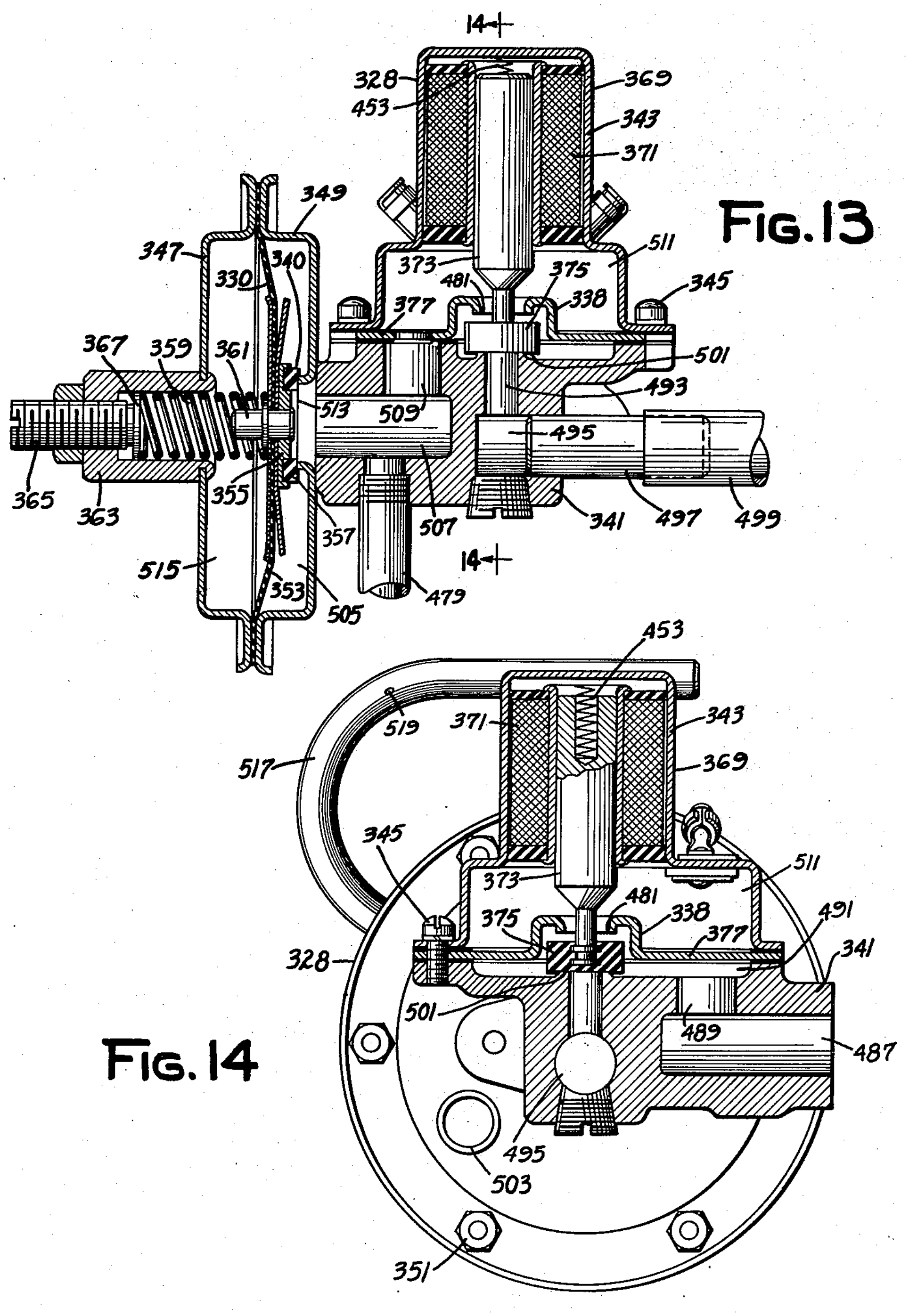
Figure 13 is a sectional view, taken on the line 13—13 of Figure 11, the valve mechanism of Figures 11 and 12 disclosing the details thereof.
Figure 14 is a sectional view taken on the line 14—14 of Figure 13.

Describing now in detail the clutch control motor unit 328 disclosed in Figures 11–14 inclusive, the motor part thereof, disclosed in section in Figure 11, includes cup shaped casing members 331 and 333 each provided with a flange and between said flanges there is detachably secured by fastening means 335, a flexible portion of the power element 330 of said motor. The motor unit is preferably detachably secured, by studs 337, to some part of the chassis of the vehicle or other convenient support located near the clutch operating crank 334.

The aforementioned three-way valve and first stage valve, together with the means for operating said valves, is detachably secured as a unit to the casing member 333 by a stud 339 extending into a body member 341 of said unit. This unit includes a cup shaped casing member 343 detachably secured, by studs 345, to the body member 341 and also includes cup shaped casing members 347 and 349 together constituting a housing for the first stage valve 340 and the power means for operating said valve. The casing members 347 and 349 are each provided with a flange and between said flanges there is secured, by studs 351, a flexible diaphragm 353 constituting the power element of the power means for operating the valve 340. To the central part of the diaphragm 353 there is secured a hub member 355 which is recessed to receive a valve member 357 constituting the most important element of the first stage valve mechanism 340. The diaphragm 353 is biased, to the valve closed position disclosed in Figure 13, by a spring 359, one end of said spring being sleeved over a pin 361 extending through the center of the diaphragm 353 into hub member 355 and secured thereto. The other end of the spring 359 extends within the interior of a cup shaped member 363 fixedly secured to the central part of the casing member 347. A stud 365, having an enlarged end portion 367 abutting the spring 359, is threadedly mounted in the base portion of the member 363.

Describing now the valve mechanism 338 and the means for operating the same, the casing member 343 constitutes a housing for a valve operating solenoid 369 comprising a winding 371 and an armature 373 to the lower end of which is secured a valve member 375. A disk shaped member 377 is detachably secured, by the studs 345, to the body member 341 and the casing member 343 and said member 377 is cupped in its central portion.

Figure 15:
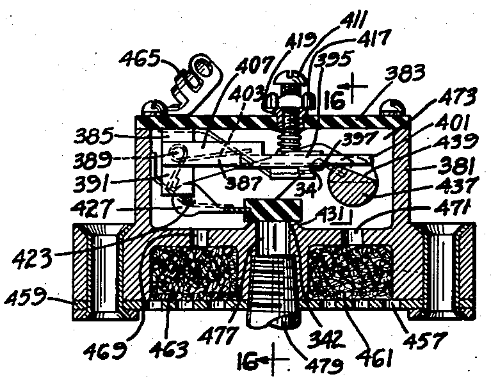
Figure 15 is a sectional view, taken on the line 15—15 of Figure 16, of the accelerator operated switch and second stage bleed valve mechanism of the clutch control mechanism disclosed in Figure 3.
Figure 16:
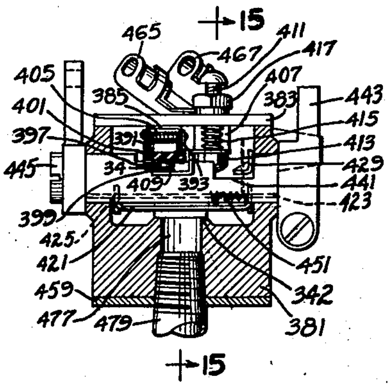
Figure 16 is a sectional view of the valve and switch mechanism of Figure 15 taken on the line 16—16 thereof.

As disclosed in Figure 2 the valve operating solenoid 369 is electrically connected in series with the grounded battery 400, a clutch pedal operated breaker switch 379, the accelerator operated breaker switch 34, Figures 15 and 16, and the grounded governor operated breaker switch 64. When these three switches are closed, that is when the accelerator is released, the vehicle is at a standstill or is travelling at or below governor speed, and the clutch pedal is released, the valve operating solenoid 369 is energized to initiate a clutch disengaging operation of the motor unit 328. As the clutch pedal is being moved to its clutch disengaged position the switch 379 is preferably opened at the cushion point of the clutch plates, that is the position of the movable driven clutch plate when it is in slight contact with the driving clutch plate; and this operation renders the clutch control mechanism inoperative until such time as the clutch pedal is returned to its clutch engaged position.

Explaining the function of the switch 379, when the engine is dead and the car is at a standstill it is best to manually disengage the friction clutch 38 prior to cranking the engine; for regardless of whether or not the transmission 44 is in neutral and regardless of the operation of the fluid clutch it is always best, to avoid a possible stalling of the engine, to unload the engine as much as possible. If, perchance the transmission is in gear, then it is quite necessary to manually disengage the friction clutch before cranking the engine. This desirable unloading of the engine is of course accomplished by disengaging the friction clutch and this must be done by depressing the clutch pedal 201. This operation is necessary for the reason that at this time, that is before the engine is started there is no source of vacuum to energize the clutch operating motor 328. Now if perchance the driver is a little slow in moving the clutch pedal to its clutch disengaged position, that is the position of the pedal necessary to effect the same separation of the clutch plates as is effected by a clutch disengaging operation of the motor unit 328, and if, during this movement, there is created a source of vacuum in the intake manifold by a starting of the engine, then the clutch motor unit will be energized before the clutch disengaging movement of the clutch pedal is completed; and this results in a sudden reduction of the force necessary to complete the disengagement of the clutch or, expressed in other words, a lightening of the clutch pedal. This is of course an undesirable effect and will probably result in the clutch pedal being slammed against the floorboard. The incorporation of the switch 379 in the means for controlling the clutch control valve 338 prevents this undesirable result.

Referring now to Figures 15 and 16 there is here disclosed the second stage bleed valve 342, the switch 34, Figure 1, and the accelerator operated means for operating said valve and switch. This mechanism includes a casing 381 hollowed out in the upper part thereof to receive the switch 34, the valve 342 and the means for operating the switch and valve. To the under side of a cover member 383, which is made of a non-conductive material, there is secured a U-shaped metallic member 385 serving as a support for a movable contact member 387 pivotally mounted on a pin 389 extending through said support and arms 391 and 393 of the movable contact member. A clip 465, mounted on the top of the cover member 383, is secured to the member 385 and to this clip there is attached the conductor, Figure 3, connected with the winding 371 of the solenoid 369. This movable contact member includes a U-shaped member 395, a contact member 397 secured to the member 395 and abutting a fixed contact member 399 when the switch is closed, a rectangular shaped filler member 401 and the aforementioned arms 391 and 393. A prong 403 of a coil spring 405, sleeved over the pin 389, lies upon the top of the filler member 401 fitted within the U-shaped member 395, said prong serving to bias the movable contact member to its switch closed position. To the under side of the cover member 383 and by the side of the movable contact member there is secured a stamping 407, said stamping being provided at one of its ends with a laterally extending projection 409 to which is secured the fixed contact member 399. A clip 467, mounted on the top of the cover member 383, is secured to the stamping 407 and to this clip there is attached the conductor, Figure 3, connected with one of the contacts, preferably the fixed contact of the clutch pedal operated breaker switch 379. Through an opening in the cover member 383 and an opening in that portion of the stamping 407 adjacent the projection 409 there extends a bolt 411.

Upon the end portion of this bolt extending through the stamping 407 there is threaded a nut 413 and a spring 415 is interposed between the under side of the cover member 383 and the top side of said stamping. A lock nut 417 may be threaded on the bolt, said nut contacting the top of a spool shaped bushing 419 mounted in the cover member 383 and provided with a bore which is threaded to receive said bolt. The bolt 411 therefore provides a means for determining the degree of gap between the fixed and movable contacts 399 and 397 when the switch is opened; for either a rotation of the bolt or a rotation of the nut 413 upon the bolt will serve to either compress the spring 415 or permit the same to expand, thereby changing the distance between the contacts 397 and 399 when in their switch open position.

Describing now the valve mechanism of the unit disclosed in Figures 15 and 16, the same comprises an irregular shaped valve support plate 421 extending crosswise of the unit and pivotally mounted upon a pin 423, the ends of which extend through the sides of the body member 381. One side of the plate 421 is turned up at 425 to provide an ear through which the pin 423 extends and the other side of said plate is turned up to provide the base portion of an arm 427 provided at its end with a laterally extending portion 429, Figure 16. The aforementioned valve member 342 is fixedly secured to the plate 421 and in its valve closed position contacts an annular portion 431 of the body member 381 constituting a valve seat. The valve plate 421 is held in its valve closed position by a valve spring 451. Both the valve member 342 and switch 34 are opened by a cam 437 pivotally mounted at its ends in the side walls of the body member 381 and shaped to provide flats 439 and 441 lying in different planes. A crank 443 is secured to a pin 445 extending from one end of the cam, said crank being connected to the accelerator 16 by the link 19, Figure 3.

Describing now the operation of the switch and valve unit, when the accelerator is in its released position the cam is moved, by an accelerator return spring 447, to its switch and valve closed position disclosed in Figures 15 and 16. As disclosed in Figure 16 the portion 429 of the arm 427 is then spaced a short distance from the flat 441 of the cam. The plate 421 is at this time held in its valve closed position by the spring 451 and the movable contact member is held in its switch closed position by the spring 405. The switch 34 being closed, the clutch control mechanism then functions to disengage the friction clutch providing of course the engine is idling to create a source of vacuum, the governor operated switch 64 is closed and the clutch pedal 201 is released to close the switch 379. To reengage the friction clutch below governor speed the driver then depresses the accelerator to open the switch 34 and open the valve 342.

Describing this operation of the switch and valve unit, when the accelerator is depressed the crank 443, which is directly connected to the accelerator by the link 19 is rotated clockwise, Figure 15, thereby rotating the cam 437. Now, inasmuch as one edge of the flat 439 is in contact with the bottom of the member 401 it follows that the clockwise rotation of the cam serves to rotate the contact member 387 in a counterclockwise direction, thereby opening the switch 34. The opening of the switch 34 results in a deenergization of the solenoid 369, thereby permitting a spring 453 to move the armature 373 downwardly to the position disclosed in Figures 13 and 14. The valve member 375, which is connected to the armature 373, is thus moved to its valve closed position disclosed in Figures 13 and 14 and this operation of the valve initiates a clutch engaging operation of the motor unit 328 which operation is described hereinafter.

By continuing the depression of the accelerator the cam 437 is rotated sufficiently to take up the lost motion between the flat 441 and the member 429, Figure 16, and further depression of the accelerator results in a rotation of the cam, and a rotation of the arm 427 and plate 421, to open the second stage bleed valve member 342. The opening of this valve member results in a venting to the atmosphere of a compartment 455 of the clutch control motor unit. The air travels to said compartment via openings 457 in a plate 459 constituting the base of the valve and switch unit, compartments 461 and 463 in said unit which compartments may be filled with steel wool or other suitable air cleaning material, ports 469 and 471 in the body member 381, a compartment 473 of the unit which houses the above described switch and valve mechanism, a duct 475, a duct 477 and a conduit 479 connected with the motor unit.

There is thus provided in the switch and valve unit disclosed in Figures 3, 15 and 16 an accelerator operated means for in part controlling the operation of the clutch operating motor unit 328; for, assuming that the switches 379 and 64 are closed and the engine idling, a release of the accelerator serves to effect a closing of the switch 34, thereby initiating a clutch disengaging operation of the motor unit. When the accelerator is depressed to open the throttle the first increment of movement of the accelerator results in an opening of the switch 34 to initiate a clutch engaging operation of the motor unit. As will be described in greater detail hereinafter, the first stage of this clutch engaging operation is automatically completed when the clutch plates contact with each other at a predetermined load and the second stage of this clutch engaging operation and opening of the throttle are, with a normal operation of the accelerator, initiated when the accelerator has been depressed far enough to initiate the movement of the link 137, Figure 3, that is after the lost motion between the end of the crank 443 and one end of the slot in the connection 33 has been taken up.

Describing now the complete operation of the clutch control mechanism disclosed in Figures 3, 15, 16 and 11–14 inclusive and incidentally completing the description of said mechanism, when the accelerator 16 is completely released to close the switch 34, the clutch pedal 201 is in its released position to close the switch 379 and the vehicle is either at a standstill or is travelling at or below the critical governor speed to thereby effect a closing of the switch 64, then the valve operating solenoid 369 is energized. This operation results in the armature 373 being drawn upwardly, against the tension of the spring 453 to seat the valve member 375 at 481, Figures 13 and 14. The clutch control motor unit 328 is then energized; for a compartment 483 of said unit is permanently vented to the atmosphere via a port 485 in the casing member 331 and the compartment 455 of said unit is at this time connected with the intake manifold of the engine via ducts 487 and 489, Figure 14, in the casing member 341 a vlave compartment 491 outlined by the member 377 and the upper surface of the body member 341, ducts 493 and 495, Figure 13, in the casing member 341, a nipple 497 fitted within the duct 495 and a flexible conduit 499 connected with the intake manifold of the engine. The diaphragm 330 of the motor unit is thus subjected to a differential of pressures resulting in its movement to the dotted line position disclosed in Figure 11 in which position the friction clutch 38 is disengaged, that is the driven clutch plate 42 is moved away from the driving clutch plate 36 against the tension of the clutch spring 344, Figure 1.

Describing now the clutch engaging operation of the motor unit 328, when the electrical circuit including the solenoid winding 371 is broken by the opening of any one of the switches 379, 64 or 34, then the solenoid 369 is deenergized. The spring 453 acting on the solenoid armature 373 then expands, thereby moving said armature and the valve member 375 connected thereto downwardly to seat said valve member at 501, Figure 14. This closing operation of the valve member 375 results in a venting of the compartment 455 of the motor unit to the atmosphere via a hollow nipple 503, Figure 12, mounted in the valve casing member 349, a compartment 505 outlined by the diaphragm 353 and said casing member 349, ducts 507 and 509 in the body member 341, a compartment 511 outlined in part by the members 377 and 343, the aforementioned compartment 491 and the aforementioned ducts 489 and 487, the latter leading to the motor compartment 455.

As will be described hereinafter this air transmitting circuit is made possible by virtue of the fact that the valve operating diaphragm 353 is moved to the left, to move the valve member 357 away from a seat 513, when the motor unit is energized; for when said unit is energized a compartment 515 of said unit is partially evacuated by virtue of a conduit 517 which is connected with the compartment 455 of the unit. It follows therefore that when the compartment 455 is partially evacuated the compartment 515 is to the same degree evacuated and this results in the aforementioned movement of the diaphragm 353, and the valve 357 connected thereto, to the left to unseat said valve. The compartment 505 is at all times vented to the atmosphere by the hollow nipple 503; accordingly, when the compartment 515 is partially evacuated the diaphragm 353 is subjected to a differential of pressures resulting in the aforementioned movement of said diaphragm.

The most important feature of the clutch control mechanism of my invention lies in the means for controlling the clutch engaging operation of said mechanism and completing the description of this operation, as stated above, the valve 338 is at this time, that is immediately after the solenoid 369 is deenergized, closed by the seating of valve member 375 on the seat 501, and the valve member 357 is positioned away from the seat 513.

Air then rushes into the motor compartment 455 from the nipple 503 via the above described air transmitting circuit and this action results in the initiation of a movement of the diaphragm 330 to the right, Figure 11, toward its clutch engaged position shown in full lines in said figure, the clutch spring 344 then functioning as a source of power. This operation immediately results in the maintenance of a partial vacuum in the motor compartments 455 and 515, and the maintenance of the diaphragm 353 and the so-called first stage valve member 357 connected thereto in their valve open positions; and the valve member 357 remains in this open position as long as the clutch spring is with full force pulling the diaphragm 330 to the right, Figure 11, to thereby maintain the partial evacuation of the compartments 455 and 515.

Now when the clutch plates contact at a certain load the pulling force of the clutch spring 344 is reduced and this operation results in a seating of the valve member 357.

Explaining this operation of the mechanism, it is to be remembered that the compartments 455 and 515 are at the time vented to the atmosphere; accordingly, when the vacuum creating movement of the piston 330 is checked by the contacting of the clutch plates, the air continues to rush into said compartments with the result that the spring 359 then functions to seat the valve member 357 and cut off the flow of air into said compartments. At this juncture it is to be observed that the time of closing of the valve 357 and the degree of loading of the clutch plates when the movement of the piston 330 is checked, is determined by the loading of the spring 359; accordingly, the initial loading of the clutch plates and the resultant initial acceleration of the vehicle is determined by the adjustment of the screw 365.

Now all of the above described clutch engaging operations of the parts of the motor unit to effect the first stage of clutch engaging movement of the power element are, with a normal operation of the accelerator, completed before the accelerator is depressed sufficiently to open the throttle and the bleed valve 342; for as previously described the first increment of movement of the accelerator effects an opening of the switch 34 and this operation initiates the aforementioned first stage operation of the motor unit. Continued depression of the accelerator opens the throttle thereby increasing the torque of the engine and the resultant driving force of the clutch plate 36, and this operation of the accelerator also opens the bleed valve 342 thereby providing the heretofore described supplementary source of air for the compartment 455 of the motor unit. Now the degree of opening of the bleed valve 342 determines the rate of flow of air into the compartment 455 with the resultant progressive increase of the clutch plate loading. There is thus provided in the accelerator operated bleed valve, means cooperating with the throttle for determining the rate of increase of the acceleration of the vehicle, said rate of increase being determined by the mode of operation of the accelerator as the same is depressed. The conduit 517 may be provided with a small bleed opening 519, thereby providing a source of air for the motor compartment 455 which supplements the air to said compartment admitted via the second stage bleed valve 342. If perchance the driver merely depresses the accelerator only a slight distance to open the bleed valve 342, then the air admitted to the compartment 455 via the opening 519 will result in an increase in loading of the clutch plates and thereby prevent a slipping of the clutch.

It is to be noted here that by constructing the mechanism of Figure 3 so that with a normal operation of the accelerator the opening of the throttle and bleed valve is timed to occur at the time when or immediately after the clutch plates first contact with each other, there is provided a mechanism which cooperates well with the fluid clutch to effect a smooth start of the vehicle from rest or a speeding up of the vehicle when the friction clutch of the mechanism of Figure 3 is reengaged by depressing the accelerator; for the fluid clutch, by virtue of its being a yieldable force transmitting medium, will prevent the engine from being stalled both before and after the second stage bleed valve is opened. If, perchance the first stage bleed valve fails to close at the proper time or fails to close at all, then the fluid clutch will, by virtue of a slipping action, prevent a stalling of the engine; and if the driver after a slight opening of the bleed valve 342 fails to continue the depression of the accelerator to increase the engine torque, then the fluid clutch will again prevent the engine from stalling. If the clutch control motor unit is provided with the fixed bleed opening 519 and the driver fails to open the bleed valve 342 then the fluid clutch will prevent the engine from stalling as the clutch plate loading is increased.

There is thus provided, in the clutch control mechanism of that embodiment of my invention disclosed in Figure 3, means cooperating with both the fluid clutch and the transmission operating and ignition controlling motor unit 46 to insure the desired acceleration of the vehicle after a kickdown operation of the transmission.

Describing now the operation of the embodiment of my invention disclosed in Figure 3 and incidentally completing the description of the several parts of this mechanism, when the vehicle is at a standstill or coasting to a stop and is below a relatively low vehicle speed, say 10 M. P. H., the parts of the mechanism are in the position disclosed in said figure. In this position of the parts the governor operating switch 64 is closed and the accelerator 16 is of course completely released. The friction clutch is accordingly disengaged by the clutch operating motor unit 328 which, as previously described, is energized when the valve 338 is opened.

Now when the grounded switch 64 is closed the electromagnet 308 of the relay mechanism 304 is energized and an electrical circuit is completed via said switch 64, a conductor 380, the electromagnet 308, conductors 382, 384, 386, 388 and 390, a fuse 392, a conductor 394, the ignition switch 396 of the ignition system, conductor 398 and a grounded battery 400.

The energization of the electromagnet 308 results in an opening of the switch 310 with the resultant opening of the electrical circuit interconnecting the grounded battery 400 and the grounded holding coil 98, said circuit including the conductor 398, the ignition switch 396, the conductor 394, the fuse 392, conductors 390, 388, 386 and 384, conductors 402 and 404, switch 310, conductors 406, 408, 410 and 154, valve operating solenoid 116, conductor 112 and the holding coil 98; and when this circuit is open the solenoid 116 and the holding coil 98 are deenergized, the transmission is established in its kickdown setting and the ignition interrupter switch 124 is opened, all as previously described.

As stated above, the accelerator is at this time released; accordingly the switch 31 is open, and when the switch 31 is open the electromagnet 312 of the relay 306 is deenergized resulting in the expansion of a spring 412 to open the breaker switch 314 of said relay. This switch 314 constitutes a part of the electrical means interconnecting the grounded ignition interrupter 124 of the motor unit 46 and the primary winding of the ignition coil 52 of the engine controlling ignition system. This electrical means also includes the conductor 136, conductors 418 and 420 and conductors 422 and 424, the latter being connected with the primary winding of the ignition coil. It follows therefore that when the vehicle is coasting to a stop with the accelerator released to close the switch 34 and open the switch 31, the clutch is disengaged to reverse the engine torque and thereby facilitate the kickdown operation of the motor unit 46, the latter operation being automatically effected when the speed of the vehicle reaches the critical speed of the governor, say 10 M. P. H. It is to be noted that in this operation of the mechanism disclosed in Figure 3 there is no disabling operation of the ignition system, for the relay switch 314 is at the time open; accordingly, the primary winding of the ignition coil may not be grounded.

It will be assumed now that the vehicle is at a standstill with the engine idling, the clutch being then disengaged and the transmission being then established in its so-called kickdown setting, and that the driver then wishes to start the vehicle in motion. If the vehicle is perchance mired in the mud the driver will then manually operate the transmission by moving the selector lever positioned beneath the steering wheel to its low gear position. The transmission having been established in this low gear setting by an operation of the shift lever and the crank 48 having been actuated by the motor unit 46 to establish the transmission in its kickdown setting, it follows that all operations are completed preparatory to getting the vehicle under way. The driver then depresses the accelerator, thereby effecting a controlled engagement of the friction clutch by the operation of the motor 328 and the vehicle gets under way slowly and smoothly. It is to be particularly noted that the fluid coupling 35 cooperates with the two stage clutch engaging operation of the motor unit 328 in effecting a smooth start, that is relatively low acceleration of the vehicle.

After the vehicle is under way above governor speed the driver will probably desire a higher gear ratio setting of the transmission; accordingly, he will move the shift lever to establish this setting. The accelerator will be released to reverse the engine torque prior to so operating the transmission and this operation, in cooperation with the fluid coupling, facilitates the necessary demeshing operation of the transmission. Explaining this so-called reversal of the engine torque the release of the accelerator effects an idling operation of the internal combustion engine, that is said engine is at the time not serving as a prime mover to drive the aforementioned movable drive control element of the transmission; and as previously described the release of the accelerator to idle the engine and open the switch 31 also serves to energize the motor unit 46 to establish the transmission in its upshift gear ratio setting. Describing this operation of the mechanism of Figure 3 when the vehicle is travelling at the higher of the two governor speeds, say 13 M. P. H., the switch 64 is opened, thereby deenergizing the relay electromagnet 308. A spring 426, interposed between one end of the electromagnet 308 and the movable contact 428 of the switch 310, then expands, closing said switch and thereby completing the electrical circuit through the solenoid 116 and holding coil 98 of the motor unit. In the manner previously described the motor unit is then energized by vacuum to effect the upshift setting of the transmission and the closing of the ignition interrupter switch 124.

The upshift operation of the transmission having been effected the driver will then again depress the accelerator to increase or maintain the speed of the vehicle. It will be assumed now that the internal combustion engine is operating at a speed below that necessary to open the wind switch 316 and that the driver desires to effect a kickdown operation of the transmission to thereby make it possible to quickly pass another vehicle on the road. To effect this operation of the transmission all that the driver need do is to depress the accelerator all the way open, that is far enough to close the switch 31. This operation effects a closing of the electrical circuits to energize both the electromagnets 308 and 312 of the relay mechanism 302; for as disclosed in Figure 3 the electromagnet 312 is electrically connected to the battery 400 by a conductor 428, the conductor 402 and all but the conductor 382 of the previously described electrical means connecting the battery and the electromagnet 308. The electromagnet 312 is electrically connected to the then closed grounded wind switch 316 by means of a conductor 430, the poles 432 and 433 and the movable contact plate 434 of the then closed three-pole switch 31 and a conductor 436. As to the closed electrical circuit effecting the energization of the electromagnet 308 this circuit includes the grounded wind switch 316, the conductor 436, the pole 433, the movable contact 434 and a pole 438 of the switch 31, a conductor 440, a part of the conductor 380, the electromagnet 308 and the previously described electrical means interconnecting said magnet with the grounded battery, all as disclosed in Figure 3.

Now when the electromagnets 308 and 312 are energized the movable contact 428 of the switch 310 and the movable contact 442 of the switch 314 are moved to close the switch 314 and open the switch 310. This operation results in a deenergization of the solenoid 116 and holding coil 98 of the motor unit 46 thereby effecting an energization of said unit by an operation of the spring 208, all as previously described. This operation also makes possible, by virtue of the closing of the switch 314 a momentary disabling of the ignition system as the motor unit is operating.

It is apparent therefore that when the accelerator is fully depressed the motor unit 46 is energized by the expansion of the spring 208 to establish the transmission in its kickdown setting, this operation being facilitated by momentarily disabling the ignition system to reverse the torque of the internal combustion engine. If the engine is operating at a relatively high speed, which operation usually results in a relatively high vehicle speed, say 50 M. P. H., then this kickdown operation of the motor unit is not effected when the accelerator is depressed far enough to close the switch 31; for the wind switch 316 is then opened thereby making it impossible to complete the electrical circuits to energize the electromagnets of the relay mechanism 302.

Continuing the description of a cycle of operations of the mechanism disclosed in Figure 3 it will be assumed that the kickdown operation of the transmission served its purpose of enabling the driver to quickly pass the other car on the road. The driver will then probably again release the accelerator sufficiently to again energize the motor unit 46 by vacuum to effect an upshift operation of the transmission. To bring the vehicle to a stop the accelerator is released and when the speed of the vehicle is decreased below governor speed the motor unit will, by virtue of the closing of the governor operated switch 64, again be energized by the spring 208 to effect another kickdown operation of the transmission. The disengagement of the friction clutch by the motor 328 will of course facilitate this operation.

Concluding the discussion of the mechanism disclosed in Figure 3, it is to be noted that by virtue of the incorporation of the ignition switch 396 in the wiring between the battery and the relay switch 310, said ignition switch serves the useful function, when it is opened, of insuring a deenergization of the solenoid 116 and holding coil 98 despite a failure of operation of the relay mechanism; for should this relay mechanism fail in its operation of opening the switch 310, that is opening the electrical circuit from the solenoid and holding coil to the battery when the car is being brought to a stop below governor speed, then the compartment 198 of the motor unit 46 would, by virtue of the pumping action of the engine pistons, continue to be partially evacuated to hold the power element of the motor unit in its upshift position and the then energized holding coil would continue to function to hold the power element in this position. This operation would result in the transmission being established in an undesired gear ratio setting when the car is brought to a stop. This setting of the transmission, that is the higher of the two gear ratio settings effected by the operation of the motor unit 46, is particularly undesirable when the car is brought to a stop on an incline; for when the vehicle is then again started in motion the engine, because of the relatively high gear ratio setting of the transmission, might be stalled. Now by the incorporation of the ignition switch in the electrical circuit interconnecting the battery, the solenoid 116 and the holding coil 98 there is provided a mechanism which prevents this undesired result; for when the driver, either intentionally or unintentionally opens the ignition switch before the car rolls to a stop the solenoid 116 and holding coil 98 are automatically deenergized and this operation results in connecting the motor compartment 198 to the atmosphere thereby effecting a downshift operation of the motor unit. When the driver brings the car to a stop in a conventional manner he usually opens the ignition switch to stop the engine after the car is stopped in the desired position; however, the principal virtue of the above described mechanism lies in the fact that should the driver carelessly cut off the ignition switch as the car is being brought to a stop or on an incline the transmission will, because of this very act, be established in its downshift setting. The ignition switch 76 in the mechanism of Figure 2 also serves this useful purpose.

Figure 4:
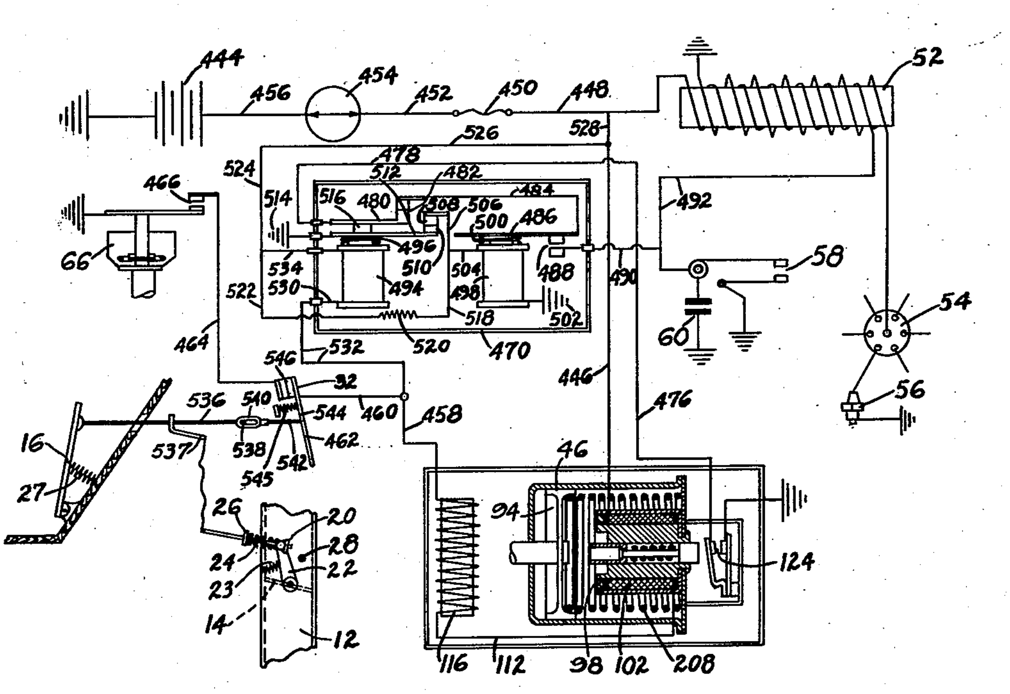
Figure 4 is a diagrammatic view of another embodiment of the transmission operating and ignition controlling power means of my invention.

There is disclosed in Figure 4 another embodiment of my invention wherein the valve operating solenoid 116 and the holding coil 98 of the previously described power unit 46 are electrically connected to a grounded battery 444 by conductors 446 and 448, a fuse 450, a conductor 452, an ignition switch 454, and a conductor 456. The solenoid 98 is connectible to ground by a conductor 458 and 460, an accelerator operated breaker switch 462, conductor 464 and a grounded switch 466 operated by the governor 66 the switch being disclosed in Figure 21 and the governor in Figure 18. It is to be noted that in the electrical hookup disclosed in Figure 4 the accelerator operated switch 462 and the governor operated switch 466 are wired in series with the solenoid 116 and holding coil 98 whereas in the embodiments of my invention disclosed in Figures 1 and 13 said switches are wired in parallel with the relay mechanism for controlling the operation of said solenoid and holding coil.

Referring now to Figures 18 and 21 there is here disclosed in detail the governor 66 and switch 466 disclosed diagrammatically in Figure 4, said governor and switch together constituting one control unit as indicated by said figures. The governor 66 has been described in detail above and, as clearly disclosed in Figure 21, the switch 466 differs only from the switch 64, Figures 18, 19 and 20, in the positioning of a fixed contact 468 of said switch with respect to the movable contact 260' thereof. This fixed contact is secured in position by a bracket 470 fixedly secured to a casing member 212' and, as disclosed in Figure 21, a contact member 263' secured to the end of the movable contact member 260' is spaced from the contact member 468 when the movable contact member is moved by a spring 294' to the position disclosed in said figure; and the movable contact member is held in this position by said spring when the parts of the governor 66 are in the position disclosed in Figure 18, that is when the car is at a standstill or is travelling at a speed to permit the spring 294' to remain expanded. The parts of the switch 466 which are duplicates of the corresponding switch 64 are indicated by the same reference numerals given to the parts of the latter switch plus a prime. It is apparent therefore that there is no need to describe the operation of the governor 66 and switch 466 of the mechanism disclosed in Figures 4 and 21, for this mechanism operates in the same manner as the heretofore described governor 66 and switch 64 with the exception that the opening and closing operation of said switches are reversed.

The most important feature of the invention disclosed in Figure 4 lies in the means for momentarily disabling the ignition system to facilitate the downshift operation of the motor unit 46, said means including the hereinafter described relay mechanism 470. Describing now this disabling means the grounded ignition interrupter switch 124 of the motor unit 46 is electrically connected to the primary winding of the ignition coil 52 by conductors 476 and 478, the movable contact 480 of a relay switch 482, a conductor 484, the movable contact 486 of a relay switch 488, a conductor 490 and a conductor 492. As disclosed in Figure 4 the switch 482 is operated by means of an electromagnet 494 and a spring 496 and the switch 488 is operated by means of a time delay electromagnet 498 and a spring 500. One end of the winding of the electromagnet 498 is grounded at 502 and the other end of said winding is connected by conductors 504 and 506 to the fixed contact 508 of a relay switch 510, the movable contact 512 of which is grounded at 514. The movable contacts 512 and 480 of the switches 510 and 482 respectively are tied together by a member 516 and said contacts together constitute an armature member moved upwardly by the spring 496 to simultaneously close the switches 510 and 482 and drawn downwardly to simultaneously open said switches when the electromagnet 494 is energized. The last mentioned end of the winding of the electromagnet 498 is also electrically connected to the grounded battery 444 by means of a conductor 518, a resistance coil or so-called resistor 520, conductors 522, 524, 526 and 528, conductor 488, fuse 450, conductor 452, ignition switch 454 and the conductor 456. One end of the winding of the electromagnet 494 is connected to the accelerator switch 462 by conductors 530, 532 and 460 and the other end of said winding is connected to the battery by a conductor 534, the conductor 524 and the above described electrical means interconnecting the battery with the conductor 524.

Describing now the operation of the mechanism disclosed in Figure 4 it will be assumed that the vehicle is in motion above governor speed, that is a speed of the vehicle high enough to effect a closing of the switch 466. The accelerator 16 is at the time not depressed far enough to open the switch 462 which is in series with the governor operated switch 466. The switches 466 and 462 being closed it follows that the electromagnet 494, which is wired to the battery, is energized and when energized the switches 482 and 510 are opened; for as described above, when the electromagnet 494 is energized the united movable contacts 480 and 512 are drawn downwardly to open said switches.

Now when the switch 510 is opened the grounded time delay electromagnet 498 is energized inasmuch as the flow of electricity from the grounded battery 444 to said electromagnet is uninterrupted; and as will be described hereinafter when the switch 510 is closed the battery 444 is shorted resulting in a deenergization of said electromagnet 498.

Completing the description of the state of the above described relay mechanism 490 when the car is in motion above governor speed to close the switch 466, and the accelerator operated switch 462 is closed, the energization of the electromagnet 498 results in a closing of the switch 488. As to the operation of the holding coil 98 and the valve operating solenoid 116, when the car is in motion above governor speed and the accelerator has not been depressed far enough to open the switch 462, these elements are of course energized resulting in a closing of the interrupter switch 124 and a holding of the power element 94 of the motor unit 46 in its high gear position, all as previously described.

It will be assumed now that a car equipped with the mechanism disclosed in Figure 4 is being driven along the highway above governor speed and that the driver of the vehicle wishes to say either quickly pass a car or climb a hill. To accomplish either of these results the driver will probably decide to establish the transmission in a lower gear ratio by moving the crank 48 to its kickdown position; and to effect this operation he depresses the accelerator far enough to open the switch 32 thereby breaking the circuits to the electromagnet 494, the holding coil 98 and the solenoid 116 resulting in their deenergization. To effect this operation there is provided a link 536 connected to a link 537 the latter link interconnecting the accelerator with the throttle valve 14 through the intermediary of the spring 24. To one end of the link 536 there is secured a pin 538 slidable within a slotted end portion 540 of a link 542 connected to a crank 544 biased to its switch closed position by a spring 545. To one end of the crank there is attached the movable contact 546 of the switch 32, said contact abutting the fixed contact of said switch when the latter is closed. When the accelerator is depressed the throttle 14 is opened and when said throttle is wide open, that is when the throttle operating crank 22 contacts the stop 28, continued depression of the accelerator results in a compression of spring 24 and the abutment of the pin 538 with one end of the slotted portion 540 of the link 542. It follows therefore that this last increment of movement of the accelerator serves to rotate the crank 544 to open the switch 32. When the accelerator is released the spring 545 rotates the crank 544 to close the switch 32 as the spring 24 expands. After the spring 24 has expanded a spring 23 secured to the throttle operating crank 22 and weaker than the spring 24 functions in cooperation with an accelerator return spring 27, to close the throttle 14 and return the accelerator to its throttle closed position.

As previously described the motor unit 46 is, by the opening of the switch 32, energized by the expansion of the spring 208 and the ignition interrupter switch 124 is very quickly thereafter opened; and by this so-called kickdown operation of the motor unit the transmission operating crank 48 is moved to its kickdown setting, that is a relatively low gear ratio setting of the transmission.

Describing now the essence of the invention disclosed in Figure 4, the relay mechanism 470, including the electromagnets 494 and 498 and the switches operated thereby, provides means for insuring a resumption of operation of the ignition system despite a failure of the ignition interrupter switch to open; for the switch 124 might possibly fail to open when the motor unit 46 is operated to establish the transmission in its kickdown setting; e. g., the plunger 140 might stick, thereby remaining in its switch closed position disclosed in Figure 7. As will be apparent from the above described operation of the relay mechanism, when the electromagnet 494 is deenergized either by an opening of the switch 466 or the switch 32 the contacts 480 and 512 of the switches 482 and 510 respectively are moved by the spring 496 to the switch closed position disclosed in Figure 4. This operation completes the closing of the circuit from the then closed ignition interrupter switch 124 to the then closed switch 488, thereby grounding the primary winding of the ignition coil 52 with the resultant disabling of the ignition system; for it is to be remembered that prior to an opening of either of the switches 466 or 32 the time delay electromagnet 498 is energized to close the switch 488. Now when the switch 510 is closed the battery 444 is shorted and simultaneously with this shorting of the battery there is initiated a deenergization of the time delay electromagnet 498; for the latter, by virtue of the shorting of the battery, is no longer connected with a source of electrical current. This deenergizing operation of the time delay electromagnet is not effected instantly and said electromagnet is preferably so constructed that the time required to complete said operation is equal to or substantially equal to the time during which the switch 124 remains closed as the shiftdown operation of the motor unit 46 is being effected. After the deenergization of the electromagnet 498 is completed the switch 488 is of course immediately opened by the spring 500. The resistor 520 is incorporated in the electrical connection between the grounded switch 510 and the battery to prevent what is known as a dead short of the battery when the switch 510 is closed. There is thus provided, in the above described relay mechanism, means for insuring an opening of the circuit grounding the primary winding of the ignition coil, that is means for insuring a resumption of operation of the ignition system after the same has been rendered inoperative.

Continuing the description of the operation of the mechanism disclosed in Figure 4 the driver will, after the desired speed of the vehicle is attained with the transmission in its kickdown position, release the accelerator thereby closing the switch 32 and the throttle 14, the latter operation resulting in providing in the intake manifold a source of vacuum to energize the motor unit 46. The switch 466 being at the time closed it follows that the electromagnet 494 will again be energized to open the switches 510 and 482 and the solenoid 116 and holding coil 98 will again be energized to effect an upshift operation of the motor unit. This operation of course also effects a closing of the ignition interrupter switch 124 and a holding of the power element of the motor unit in its upshift position. The transmission will remain established in its upshift setting so long as the switches 466 and 32 remain closed; and when the car is being brought to a stop the transmission will, when the car has slowed down to governor speed, be automatically established in its kickdown, that is downshift setting and will remain in this setting when the car is at a standstill.

There is thus provided in the mechanism disclosed in Figures 1–4 inclusive, a power plant for an automotive vehicle requiring of the driver but a minimum of metal and physical effort in the control thereof. The controls for said power plant, all of which constitute a part of my invention, consist of the accelerator, an ignition switch, a governor operated switch, a clutch pedal, and a transmission operating shift lever. These elements control the operation of the internal combustion engine, the ignition system, a fluid clutch, a friction clutch, a change-speed transmission and power means constituting part of the means for operating said transmission. The accelerator operates a switch for controlling the operation of the transmission and also operates the throttle of the engine thereby controlling the engine torque and the operation of the fluid clutch. The ignition switch constitutes not only a part of the ignition system which in part controls the operation of the internal combustion engine, but also serves to in part control the operation of the transmission operating power means. The clutch pedal cooperates with the fluid clutch to control the connection between the engine and the transmission; the shift lever cooperates with the transmission operating power means to effect an operation of the transmission and the governor operated switch cooperates with the accelerator operated switch to control the operation of the transmission operating power means.

It may be added that with the embodiment of my invention disclosed in Figure 3 the accelerator, clutch pedal and governor operated switch of the aforementioned controls cooperate to control the operation of the friction clutch; and the accelerator and the governor operated switch serve as part of the means for controlling both a clutch operating power means and the aforementioned transmission operating power means.

In short, all of the aforementioned five controls cooperate to make of the power plant an efficient and effective means for propelling the vehicle.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with a change-speed transmission, an internal combustion engine, an ignition system including an ignition coil for in part controlling the operation of said engine, an accelerator, a battery and a vehicle speed responsive governor, power means for in part controlling the operation of the transmission and ignition system, said power means comprising a spring and pressure differential operated motor unit including a valve operating solenoid, a power element, a power element holding coil and a grounded ignition interrupter switch and electrical means for controlling the operation of said solenoid, holding coil and switch including a relay mechanism comprising a breaker switch operable to control the operation of the ignition interrupter switch, another breaker switch operable to control the operation of the aforementioned solenoid and holding coil and further comprising electromagnetic means including a coil for operating one of the breaker switches and another coil for operating the other of the breaker switches, said electrical means further including an accelerator operated switch and a governor operated switch for controlling the operation of said electromagnetic means, electrical conductor means interconnecting in series the primary winding of the ignition coil, the first-mentioned breaker switch and the grounded ignition interrupter switch and electrical conductor means interconnecting in series the battery, the second-mentioned breaker switch, the solenoid and the holding coil.

2. In an automotive vehicle provided with an accelerator and a change-speed transmission, means for operating said transmission including a crank movable to one or the other of two positions to establish the transmission in one or the other of two of its settings, power means for moving said crank to said positions, said power means including a spring and vacuum operated motor unit and means for controlling the operation of said unit including a three-way valve, a solenoid for operating said valve, means for controlling the operation of said solenoid including a relay mechanism comprising a breaker switch and an electromagnet for operating said switch, and means for controlling the operation of said electromagnet comprising a wind switch, an accelerator operated switch, and electrical conductor means interconnecting in series the wind switch, the accelerator operated switch and the aforementioned breaker switch operating electromagnet.

3. In an automotive vehicle provided with an internal combustion engine, a change-speed transmission, an ignition system for in part controlling the operation of said engine, an accelerator and a vehicle speed responsive governor, power means for in part controlling the operation of said transmission and in part controlling the operation of said ignition system, said power means including a spring and pressure differential operated motor unit comprising a control valve, a valve operating solenoid, a power element operably connected to the transmission, a holding coil operative when energized to maintain the power element in one of its operative positions, an ignition interrupter switch and yieldable means interposed between the power element and the ignition interrupter switch and operative, when the power element moves to one of its operative positions, to permit the switch to open after and only after the power element has moved a certain distance, said power means further including relay mechanism, including a plurality of electromagnets and a plurality of breaker switches, for controlling the operation of the solenoid, the holding coil, and the ignition interrupter switch and means for controlling the operation of said relay mechanism comprising an accelerator operated switch and a switch operated by the aforementioned speed responsive governor one of the electromagnets being controlled by the operation of either the governor operated switch or the accelerator operated switch and the other of the electromagnets being controlled by the operation of the accelerator operated switch.

4. In an automotive vehicle provided with an accelerator, a speed ratio changing transmission and an internal combustion engine controlling ignition system, means for operating said transmission and in part controlling the operation of said ignition system including a crank movable to one or the other of two positions to establish the transmission in one or the other of two of its settings, power means for moving said crank to said positions, said power means including a spring and vacuum operated motor unit comprising a three-way valve, a solenoid for operating said valve, and an ignition interrupter switch, means for controlling the operation of said solenoid and ignition interrupter switch including a relay mechanism and means for controlling the operation of the relay mechanism including a two-pole wind switch having a grounded movable contact member, electrical conductor means, including an accelerator operated breaker switch, interconnecting one pole of said switch with an electric magnet of the relay mechanism, said relay controlling mechanism further including a grounded vehicle speed responsive governor operated breaker switch, the parts of the relay controlling mechanism being so constructed and arranged that with the wind switch in one of its operative positions the power unit is spring energized to effect one of the operations of the transmission operating crank when the accelerator operated switch is closed by depressing the accelerator beyond its full throttle open position.

5. In an automotive vehicle provided with a change-speed transmission, an ignition system, an accelerator and a vehicle speed responsive governor, power means for in part controlling the operation of the ignition system and transmission, said power means including a power unit comprising an ignition interrupter switch, a holding coil for the power element of said unit and a valve operating solenoid, control mechanism for the power means including two electromagnetic relays, the breaker switch of one of said relays cooperating with the ignition interrupter switch to effect a momentary disabling of the ignition system to facilitate a certain power operation of the transmission and the breaker switch of the other of said relays serving to control the operation of the holding coil and valve operating solenoid and means for controlling the operation of said relays including an accelerator operated switch, a governor operated switch and a switch operative as a function of the speed of the engine.

6. In an automotive vehicle provided with an internal combustion engine, an ignition system for in part controlling the operation of said engine, a battery, an accelerator operated switch, means operative as a function of the speed of the engine for disabling the accelerator operated switch when the engine is travelling at or above a predetermined speed, a vehicle speed responsive governor, a grounded switch operated by said governor, a change-speed transmission and a crank extending from the casing of the transmission and serving when operated in one direction to establish one setting of the transmission and when operated in the other direction to establish another setting of the transmission, power means for in part controlling the operation of the ignition system and for actuating said crank to one or the other of its two operative positions, said power means including a motor unit comprising a casing, a power element operably connected to said crank, a power element holding coil, a control valve, a solenoid for actuating said valve and a grounded ignition interrupter switch, control mechanism for the power means including a relay mechanism, the electromagnet of which is wired to the battery and to the aforementioned switches and the switch mechanism of which includes two breaker switches, one of which is wired to the battery and holding coil and valve operating solenoid and the other of which is wired to the grounded interrupter switch and the primary winding of the ignition coil of the ignition system.

7. In an automotive vehicle provided with a change-speed transmission and an engine controlling ignition system, power means for operating said transmission and in part controlling the operation of said ignition system said power means including a spring and pressure differential operated motor unit comprising a casing, a power element housed within said casing, transmission operating force transmitting means connected with the power element, a power element operating spring interposed between said element and one part of the casing, a power element holding coil housed within said casing, an ignition controlling switch means positioned adjacent said holding coil said switch means including fixed contact means secured to the casing and further including a flexible movable contact member, and switch operating force transmitting means, including a yieldable member, interposed between a portion of the aforementioned force transmitting means and the movable contact member, the parts of said mechanism being so constructed and arranged that when the holding coil is energized and the motor unit is energized by subjecting its power element to a differential of pressures then the switch is closed by the movement of the power element to a certain position, said power element being held by the holding coil in this position, the parts of the mechanism also being so constructed and arranged that when the holding coil is deenergized and the motor unit is energized by the expansion of the aforementioned spring, then the switch is opened after the power element has moved a sufficient distance to permit the yieldable member to expand.

8. In an automotive vehicle provided with a change-speed transmission and an engine controlling ignition system, power means for operating said transmission and in part controlling the operation of said ignition system said power means including a spring and pressure differential operated motor unit comprising a casing, a power element housed within said casing, transmission operating force transmitting means connected with the power element, a power element operating spring interposed between said element and one part of the casing, a power element holding coil housed within said casing, an ignition controlling switch means positioned adjacent said holding coil said switch means including fixed contact means secured to the casing and further including a flexible movable contact member, and switch operating force transmitting means, extending in part within a part of the aforementioned force transmitting means and including a yieldable member, a plunger member housing said yieldable member and a rod extending through said holding coil, said switch operating force transmitting means being interposed between a portion of the aforementioned force transmitting means and the movable contact member, the parts of said mechanism being so constructed and arranged that when the holding coil is energized and the motor unit is energized by subjecting its power element to a differential of pressures then the switch is closed by the movement of the power element to a certain position, said power element being held by the holding coil in this position, the parts of the mechanism also being so constructed and arranged that when the holding coil is deenergized and the motor unit is energized by the expansion of the aforementioned spring, then the switch is opened after the power element has moved a sufficient distance to permit the yieldable member to expand.

9. In an automotive vehicle provided with a change-speed transmission and an engine controlling ignition system, power means for operating said transmission and in part controlling the operation of said ignition system said power means including a spring and pressure differential operated motor unit comprising a casing, a power element housed within said casing, transmission operating force transmitting means connected with the power element, a power element operating spring interposed between said element and one part of the casing, a power element holding coil housed within said casing, an ignition controlling switch means positioned adjacent said holding coil said switch means including fixed contact means secured to the casing and further including a flexible movable contact member, and switch operating force transmitting means interposed between a portion of the aforementioned transmission operating force transmitting means and the movable contact member said switch operating force transmitting means including a hollow plunger member, a rod having one end thereof extending within said plunger member and a yieldable member interposed between one end of the plunger member and a portion of said rod, the parts of said mechanism being so constructed and arranged that when the holding coil is energized and the motor unit is energized by subjecting its power element to a differential of pressures then the switch is closed by the movement of the power element to a certain position, said power element being held by the holding coil in this position, the parts of the mechanism also being so constructed and arranged that when the holding coil is deenergized and the motor unit is energized by the expansion of the aforementioned spring, then the switch is opened after the power element has moved a sufficient distance to permit the yieldable member to expand.

HAROLD W. PRICE.

REFERENCES CITED

The following references are of record in the file of this patent:

UNITED STATES PATENTS

| Number | Name | Date |
|---|---|---|
| 730,667 | Linn | June 9, 1903 |
| 1,908,471 | Brewer | May 9, 1933 |
| 1,970,375 | Hale | Aug. 14, 1934 |
| 2,157,328 | Durham | May 9, 1938 |
| 2,170,982 | Ellinwood | Aug. 29, 1939 |
| 2,218,136 | Price | Oct. 15, 1940 |
| 2,252,009 | Kenny | Aug. 12, 1941 |
| 2,267,603 | Claytor | Dec. 23, 1941 |
| 2,279,999 | McKechnie | Apr. 14, 1942 |
| 2,281,916 | Claytor | May 5, 1942 |
| 2,283,625 | Claytor | May 19, 1942 |
| 2,291,189 | Matulaitis | July 28, 1942 |
| 2,306,865 | Claytor | Dec. 29, 1942 |
| 2,309,468 | Matulaitis | Jan. 26, 1942 |
| 2,319,746 | Orr | May 18, 1943 |
| 2,328,291 | Osborne | Aug. 31, 1943 |
| 2,333,668 | Neracher et al. | Nov. 9, 1943 |
| 2,348,763 | Syrovy et al. | May 16, 1944 |
| 2,425,889 | Matulaitis | Aug. 19, 1947 |
| 2,425,890 | Matulaitis | Aug. 19, 1947 |